United States Patent
Garg et al.

(10) Patent No.: US 11,269,334 B2
(45) Date of Patent: *Mar. 8, 2022

(54) SYSTEMS AND METHODS FOR AUTOMATED TESTING OF AUTONOMOUS VEHICLES

(71) Applicant: UATC, LLC, San Francisco, CA (US)

(72) Inventors: Sunil Kumar Garg, San Francisco, CA (US); Todd William Sifleet, Walnut Creek, CA (US); Venkata Sathya Praveen Gorthy, Pleasanton, CA (US); Lili Kan, Cupertino, CA (US); Emily Anna Weslosky, San Francisco, CA (US)

(73) Assignee: UATC, LLC, Mountain View, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 16/672,079

(22) Filed: Nov. 1, 2019

(65) Prior Publication Data

US 2020/0097009 A1    Mar. 26, 2020

Related U.S. Application Data

(63) Continuation of application No. 15/647,866, filed on Jul. 12, 2017, now Pat. No. 10,466,705.

(51) Int. Cl.
*G05D 1/02* (2020.01)
*B60K 35/00* (2006.01)

(52) U.S. Cl.
CPC ........... *G05D 1/0212* (2013.01); *B60K 35/00* (2013.01)

(58) Field of Classification Search
CPC .............................. G05D 1/0212; B60K 35/00
See application file for complete search history.

(56) References Cited

U.S. PATENT DOCUMENTS

| 5,177,685 A | 1/1993 | Davis et al. |
|---|---|---|
| 8,301,374 B2 | 10/2012 | Surampudi et al. |
| 9,310,808 B2 | 4/2016 | Shankwitz et al. |
| 2004/0073337 A1 | 4/2004 | McKee et al. |
| 2015/0228125 A1 | 8/2015 | Silva et al. |
| 2017/0192437 A1 | 7/2017 | Bier et al. |
| 2018/0061226 A1 | 3/2018 | Thelen et al. |
| 2018/0237027 A1 | 8/2018 | Lundsgaard |
| 2018/0284774 A1 | 10/2018 | Kawamoto |

*Primary Examiner* — Nicholas Kiswanto
(74) *Attorney, Agent, or Firm* — Dority & Manning, P.A.

(57) ABSTRACT

Systems and methods for controlling autonomous vehicle test trips are provided. In one example embodiment, a computer implemented method includes obtaining, by a computing system, data indicative of a test trip index associated with an autonomous vehicle. The test trip index includes a plurality of test trips for the autonomous vehicle and each test trip is associated with one or more test trip parameters. The method includes obtaining, by the computing system, data indicating that the autonomous vehicle is available to travel in accordance with at least one of the test trips of the test trip index. The method includes selecting, by the computing system and from the test trip index, at least one selected test trip for the autonomous vehicle. The method includes causing, by the computing system, the autonomous vehicle to travel in accordance with the test trip parameters associated with the at least one selected test trip.

22 Claims, 8 Drawing Sheets

SYSTEMS AND METHODS FOR AUTOMATED TESTING OF AUTONOMOUS VEHICLES

RELATED APPLICATIONS

The preset application is based on and claims benefit of U.S. Non-Provisional patent application Ser. No. 15/647,866 having a filing date of Jul. 12, 2017, which is incorporated in its entirety by reference herein.

FIELD

The present disclosure relates generally to controlling autonomous vehicle test trips to improve autonomous vehicle performance testing and evaluation.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for controlling autonomous vehicle test trips. The method includes obtaining, by a computing system including one or more computing devices, data indicative of a test trip index associated with an autonomous vehicle. The test trip index includes a plurality of test trips for the autonomous vehicle. Each test trip is associated with one or more test trip parameters. The method includes obtaining, by the computing system, data indicating that the autonomous vehicle is available to travel in accordance with at least one of the test trips of the test trip index. The method includes selecting, by the computing system and from the test trip index, at least one selected test trip for the autonomous vehicle. The method includes causing, by the computing system, the autonomous vehicle to travel in accordance with the test trip parameters associated with the at least one selected test trip.

Another example aspect of the present disclosure is directed to a computing system for controlling autonomous vehicle test trips. The computing system includes one or more processors and one or more memory devices. The one or more memory devices store instructions that when executed by the one or more processors cause the computing system to perform operations. The operations include obtaining data indicative of a test trip index associated with an autonomous vehicle. The test trip index includes a plurality of test trips. Each test trip is associated with one or more test trip parameters. The operations include selecting, from the test trip index, a first selected test trip for the autonomous vehicle. The operations include providing data indicative of the first selected test trip to the autonomous vehicle. The autonomous vehicle travels in accordance with the first test trip.

Yet another example aspect of the present disclosure is directed to one or more tangible, non-transitory computer-readable media storing computer-readable instructions that when executed by one or more processors cause the one or more processors to perform operations. The operations include obtaining data indicative of a test trip index. The test trip index includes a plurality of test trips. Each test trip is associated with one or more test trip parameters. The test trip index is created based at least in part on user input associated with a user interface displayed on a display device. The operations include obtaining data indicating that an autonomous vehicle is available to travel in accordance with at least one of the test trips of the test trip index. The operations include selecting, from the test trip index, at least one selected test trip for the autonomous vehicle. The operations include providing data indicative of the at least one selected test trip to the autonomous vehicle. The autonomous vehicle travels in accordance with the test trip parameters associated with the at least one selected test trip.

Other example aspects of the present disclosure are directed to systems, methods, vehicles, apparatuses, tangible, non-transitory computer-readable media, and memory devices for controlling autonomous vehicle test trips.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
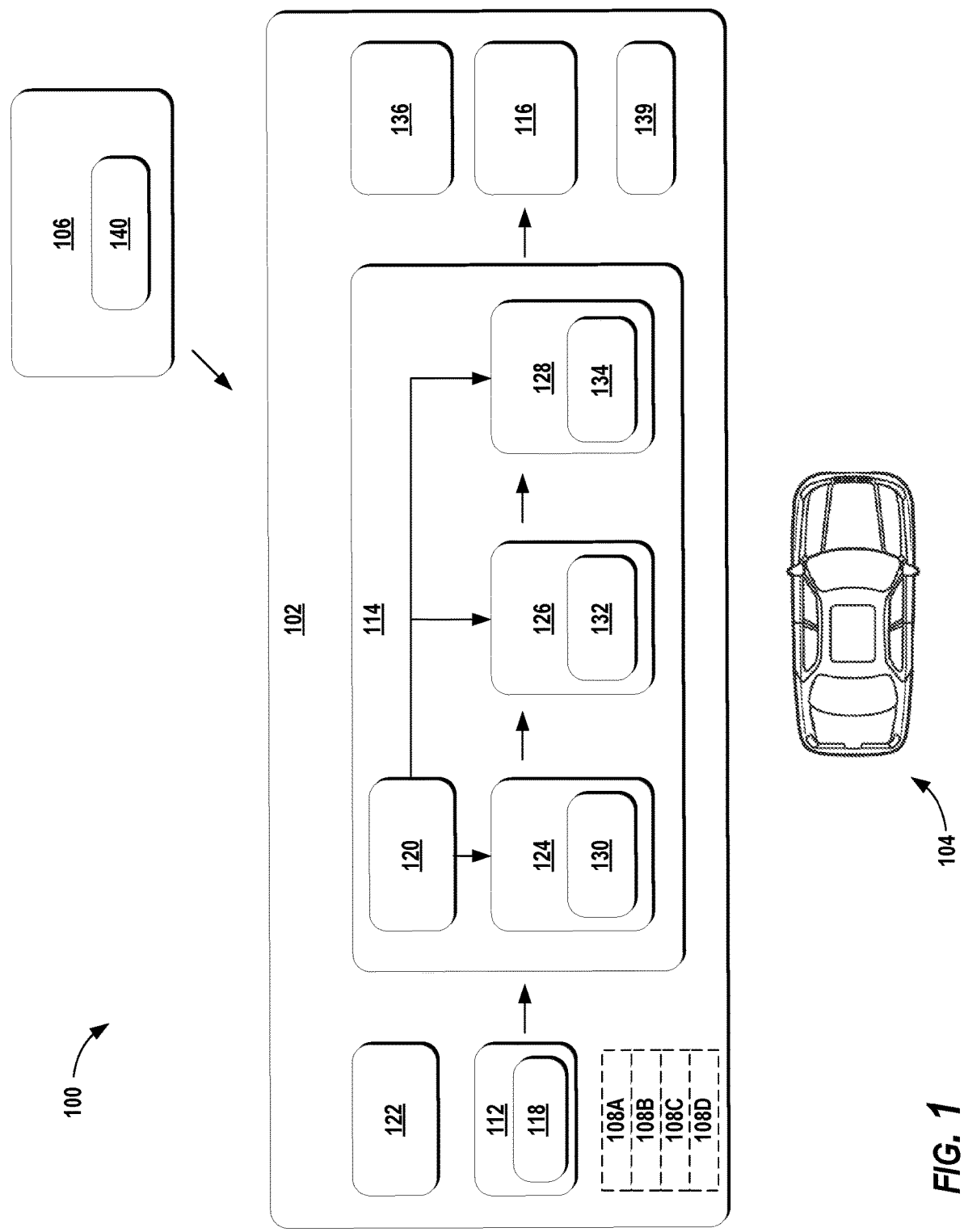
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to controlling autonomous vehicle test trips based on a test trip index to improve autonomous vehicle testing and performance evaluation. For instance, an entity (e.g., service provider) can use a fleet of vehicles to provide a vehicle service to a plurality of individuals. The fleet can include, for example, autonomous vehicles that can drive, navigate, operate, etc. with minimal and/or no interaction from a human driver. The autonomous vehicles can be configured to provide one or more vehicle services such as, for example, a transportation service (e.g., rideshare service) to one or more users by travelling from one location (e.g., a pick-up location) to another (e.g., drop-off location). When the autonomous vehicles are not travelling to provide such vehicle services, the autonomous vehicles can be used to gather test data to help evaluate vehicle performance, certain vehicle systems, software packages, etc.

To aid such testing, the systems and methods of the present disclosure provide for the automatic deployment of test trips to autonomous vehicles. A test trip is a trip during which the autonomous vehicle is to travel without providing a vehicle service. For example, a test trip can include a trip by which the autonomous vehicle is to travel from one location to another location without providing a transportation service, delivery service, courier service, etc. to a customer of the service provider. The autonomous vehicle can be associated with a test trip index that includes a plurality of test trips. The test trip index can be created by a user (e.g., a remote operator associated with the entity) via an interactive user interface displayed on a display device. The user can specify which autonomous vehicle is to be associated with the test trip index and/or the test trips included therein. Moreover, the user can specify the test trips to be included in the test trip index, along with one or more test trip parameters associated with the test trips (e.g., origin location, destination location, vehicle route, etc.). A computing system can utilize the test trip index to deploy test trips to the associated autonomous vehicle (when available) and obtain feedback data associated with such a test trip. In this way, the computing system can more efficiently gather and process test data to help evaluate the performance of the autonomous vehicle and/or its associated fleet.

More particularly, an entity (e.g., service provider, owner, manager) can use one or more vehicles (e.g., ground-based vehicles) to provide a vehicle service such as a transportation service (e.g., rideshare service), a courier service, a delivery service, etc. The vehicle(s) can be autonomous vehicles that include various systems and devices configured to control the operation of the vehicle. For example, an autonomous vehicle can include a vehicle computing system for operating the vehicle. The vehicle computing system is located onboard the autonomous vehicle, in that the vehicle computing system is located on or within the autonomous vehicle. The vehicle computing system can receive sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment.

An autonomous vehicle can be configured to operate in a plurality of operating modes. For example, an autonomous vehicle can be configured to operate in a fully autonomous (e.g., self-driving) operating mode in which the autonomous vehicle can drive and navigate with no interaction from a user present in the vehicle. The autonomous vehicle can be configured to operate in a semi-autonomous operating mode in which the autonomous vehicle can operate with some interaction from a user present in the vehicle. In some implementations, the autonomous vehicle can enter into a manual operating mode in which the vehicle is fully controllable by a user (e.g., human driver) and can be prohibited from performing autonomous navigation (e.g., autonomous driving that may be inconsistent with a human operator's control). An autonomous vehicle can be configured to switch between these operating modes depending on the circumstances (e.g., whether user assistance is needed).

The autonomous vehicle can also be configured to operate in a test trip operating mode. The test trip operating mode can enable the autonomous vehicle to receive data indicative of one or more test trips and/or to implement one or more test trips. The autonomous vehicle can enter into the test trip operating mode, for instance, when the vehicle is not providing a vehicle service and/or is in between instances of providing a vehicle service. By way of example, the autonomous vehicle can complete a trip during which the vehicle transported an individual from one location to another in response to a transportation service request made by that individual. The autonomous vehicle may not have another service request to address at that time. Thus, the autonomous vehicle can enter into the test trip operating mode such that the vehicle is available to travel in accordance with a test trip (e.g., a trip that is not for providing a vehicle service). In some implementations, the autonomous vehicle can be configured to enter into the test trip operating mode as a fallback operating mode (e.g., when the autonomous vehicle is not addressing a service request, not receiving maintenance, etc.).

The autonomous vehicle can be configured to communicate with one or more computing devices that are remote from the vehicle. For example, the autonomous vehicle can communicate with an operations computing system that can be associated with the entity. The operations computing system can help the entity monitor, communicate with, manage, etc. the autonomous vehicle and its associated fleet, if any. The operations computing system can include one or more components configured to control the test trip(s) for an autonomous vehicle. For example, the operations computing system can include an automatic test trip deployment system that can coordinate the deployment of test trips to autonomous vehicles as well as the receipt of feedback data.

The operations computing system can obtain data indicative of a test trip index associated with an autonomous vehicle (e.g., via the automatic test trip deployment system). A test trip index can be a data structure (e.g., list, table, array, tree, etc.) that includes a variety of information. For instance, the test trip index can include a plurality of test trips. The test trips are not generated in response to a service request for a vehicle service provided by the autonomous vehicle (e.g., a service request for a transportation service). Rather, the test trips are intended to be implemented by an autonomous vehicle that is not providing a vehicle service (e.g., while travelling in accordance with the test trip). A test trip can be data that defines the travel to be undertaken by the autonomous vehicle within a geographic area. For example, each of the test trips can be associated with one or more test trip parameters for the autonomous vehicle to follow when travelling in accordance with the test trip. In some implementations, the test trip parameter(s) can include an origin location, a destination location, and/or a vehicle route for an autonomous vehicle to follow.

The test trip index can be customized by a user. For instance, the operations computing system can provide data indicative of the test trip index for display via a user interface of a display device. In this way, the user can visualize and customize the test trip index and its contents. The user can provide user input (e.g., via touchscreen, mouse, keyboard, voice input, etc.) associated with the user interface to specify various information associated with the test trip index. For example, the user can specify (e.g., create, select, add, delete, edit, adjust, modify, etc.) the plurality of test trips, an order of deployment for the plurality of test trips, and/or the associated trip parameter(s) that are included in a test trip index by providing user input with respect to the user interface. By way of example, a user can create a first test trip within the test trip index via the user interface. The first test trip can include an origin location (e.g., latitude-longitude coordinate pair, address, place name, etc.) and a destination location, each specified by the user. Additionally, or alternatively, the first test trip can include a vehicle route specified by the user. In some implementations, the user interface can include a map user interface with which the user can provide user input to specify an origin location, destination location, vehicle route, etc. A user can provide the test trips in a particular order with which the user desires the test trips to be deployed and/or re-order the test trips in the event the user desires a modification to the deployment order. Accordingly, the test trips, the associated test trip parameter(s), and/or the order of the test trip parameter(s) can be pre-determined by the user.

In some implementations, the test trips of the test trip index can be based at least in part on historical data. For example, the computing system can obtain data indicative of one or more previous vehicle trips taken by the fleet of autonomous vehicles when providing vehicle services (e.g., vehicle trips previously travelled in response to a transportation service request, etc.). The computing system can generate test trip(s) and/or test trip parameter(s) based at least in part on these previously travelled vehicle trips. In this way, the test trips can be formulated to reflect actual vehicle trips that an autonomous vehicle has taken in response to a service request, which can help improve the efficacy of the test trips.

In some implementations, a test trip can be associated with a geographic area (or a portion thereof) for which there is minimal or limited data. For example, the operations computing system (and/or an entity associated therewith) may have limited data associated with a particular portion of a city at night. To help address this deficiency, the test trips can include test trip parameters that will cause an autonomous vehicle to travel within this portion of the city at night to obtain data (e.g., sensor data, perception data, etc.) that can be used to build an understanding of that portion of the geographic area.

The test trip index can be associated with an autonomous vehicle. For instance, a user can provide user input associated with the user interface in order to assign the test trip index and/or one or more of the test trip(s) to an autonomous vehicle or a plurality of autonomous vehicles. By using this type of association process, the systems and methods of the present disclosure can by-pass the typical matching process used to match autonomous vehicles to trips generated in response to service requests. The assigned autonomous vehicle(s) can be vehicle(s) that the user desires to implement the test trips. For example, the user can assign a particular test trip index and/or test trip(s) to an autonomous vehicle that has recently been equipped with hardware (e.g., sensor hardware, etc.) and/or software (e.g., motion planning software, etc.) that the user desires to test. In this way, the user can customize how and where the autonomous vehicles utilize the additional hardware and/or software to help determine the vehicle performance associated therewith. Additionally, or alternatively, the user can assign a particular test trip index and/or test trip(s) to autonomous vehicle(s) that are located within a geographic area (e.g., new neighborhood) for which the user desires to obtain additional data (e.g., sensor data for mapping a geographic area). Accordingly, the user can customize how and where the autonomous vehicle(s) gather data associated with the geographic area of interest.

In some implementations, the test trip index can be associated with one or more constraints. The constraints can be used, for example, to assign the test trip index and/or the test trips to an autonomous vehicle. For example, the user can specify (e.g., via user input) a time constraint indicating that one or more of the test trips are to be implemented during a certain time of day (e.g., night time, day time, etc.). Additionally, or alternatively, the test trip index can be associated with a weather constraint indicating that one or more of the test trips are to be implemented during certain weather conditions (e.g., rain, snow, hail, clear, etc.). The test trip index can also, or alternatively, be associated with a vehicle constraint indicating, for example, one or more type(s) of vehicles that are to receive the test trips (e.g., autonomous sport utility vehicles, vehicles with certain versions of software, etc.). In this way, the constraints can help a user control the types of testing conditions associated with a test trip.

The operations computing system can automatically deploy test trips to an autonomous vehicle (e.g., via the automatic test trip deployment system) to cause the autonomous vehicle to travel in accordance with the test trip. For instance, the operations computing system can obtain data indicating that the autonomous vehicle is available to undertake a test trip. For example, the autonomous vehicle can provide data to the operations computing system indicating that the autonomous vehicle is operating in the test trip operating mode. The operations computing system can access the test trip index associated with the autonomous vehicle and select at least one of the test trips of the plurality of test trips for the autonomous vehicle. The selected test trip can be, for example, the first test trip in the order of test trips. The operations computing system can provide data indicative of the selected test trip to the autonomous vehicle. Such data can include, for example, the test trip parameter(s) to be used for implementation of the test trip and/or other metadata (e.g., to force the vehicle to accept the test trip).

The autonomous vehicle can travel in accordance with the test trip parameter(s) associated with the selected test trip. For example, in the event that the test trip parameter(s) indicate an origin location and a destination location, the autonomous vehicle's onboard computing system can implement a motion plan to navigate the vehicle through its surrounding environment from the origin location to the destination location. In the event that the test trip parameter(s) include a vehicle route, the autonomous vehicle can implement a motion plan to navigate through its surrounding environment along the vehicle route. When the autonomous vehicle has completed the test trip, the vehicle can communicate with the operations computing system to indicate that the test trip has ended. In some implementations, the operations computing system can provide the autonomous vehicle with another test trip, if available.

The operations computing system can obtain feedback data associated with a test trip. In some implementations, the autonomous vehicle can record the feedback data as it is travelling in accordance with the test trip and can provide the feedback data to the operations computing system. Additionally, or alternatively, the operations computing system can monitor the autonomous vehicle (e.g., in real-time, near real time, periodically, etc.) to obtain feedback data. In some implementations, the feedback data can be indicative of one or more vehicle operating conditions during the test trip. For example, the feedback data can be indicative of a measurement (e.g., time, distance, percentage, etc.) of how much the autonomous vehicle travelled without manual human user control during the test trip (e.g., fully autonomous operation). The feedback data can be indicative of a measurement of how much the autonomous vehicle travelled with manual human user control during the test trip (e.g., human user assisted operation). The feedback data can be indicative of a status of the test trip (e.g., completed, in progress, not taken). In some implementations, the feedback data can indicate which autonomous vehicle(s) a test trip has been deployed to, which autonomous vehicle(s) have implemented the test trip, when a test trip was deployed/implemented, location(s) associated with the autonomous vehicle(s), etc. Additionally, or alternatively, the feedback data can include sensor data (e.g., gathered via LIDAR, radar, cameras, position sensors, etc.) that can be used to evaluate sensor performance, autonomy system performance, generate maps of navigated geographic areas, etc. The feedback data can be presented via a user interface on a display device so that a user can visualize the feedback data. Such a user interface can be the same as or different from the user interface used to help create the test trip indices. In some implementations, a computing system can process the feedback data and provide a recommendation based at least in part on the feedback data (e.g., a recommended corrective action).

The systems and methods described herein provide a number of technical effects and benefits. For instance, the systems and methods described herein improve the ability of the operations computing system to coordinate vehicle test trips and acquire feedback data associated therewith. Moreover, these systems and methods for deploying test trips and causing autonomous vehicles to travel in accordance with the test trips can lead to more efficient acquisition of feedback data as well as an increased amount of data. As such, the systems and methods described herein can provide a faster, more comprehensive evaluation of the vehicle fleet performance, vehicle computing system performance, vehicle software performance, etc. This can allow for a faster implementation of corrective actions, if needed.

The systems and methods of the present disclosure also provide an improvement to computing technology, such as computing technology associated with autonomous vehicles. For example, under the present disclosure a computing system can obtain data indicative of a test trip index associated with an autonomous vehicle. The test trip index can include a plurality of test trips for the autonomous vehicle and each test trip can be associated with one or more test trip parameters. The computing system can obtain data indicating that the autonomous vehicle is available to travel in accordance with at least one of the test trips of the test trip index (e.g., the vehicle is in a test trip operating mode). The computing system can select at least one of the test trips of the plurality of test trips for the autonomous vehicle. The computing system can provide data indicative of the at least one selected test trip to the autonomous vehicle. The autonomous vehicle can travel in accordance with the test trip parameter(s) associated with the at least one selected test trip. By utilizing the test trip index as described herein, the systems and methods of the present disclosure can improve the repeatability of the test trips. Running autonomous vehicles through repeatable test runs can lead to a better understanding of vehicle progress (e.g., toward autonomous operation) and regressions over time. Moreover, this can lead to more reliable feedback data (e.g., greater data consistency and stability) and, ultimately, to more informed and accurate recommendations regarding modifications that may need to be made to the autonomous vehicle, onboard vehicle systems, vehicle software, and/or vehicle actions within certain geographic areas. Moreover, the systems and methods improve the ability to customize and implement test trips for autonomous vehicles by using, for example, the test trip index (e.g., customizable via a user interface). This leads to improved accuracy and efficiency in planning and tracking vehicle test trips (e.g., to run vehicle stress tests) and the autonomous vehicle response thereto.

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 104 and an operations computing system 106 that is remote from the vehicle 104.

The vehicle 104 incorporating the vehicle computing system 102 can be a ground-based autonomous vehicle (e.g., car, truck, bus, etc.), an air-based autonomous vehicle (e.g., airplane, drone, helicopter, or other aircraft), or other types of vehicles (e.g., watercraft, etc.). The vehicle 104 can be an autonomous vehicle that can drive, navigate, operate, etc. with minimal and/or no interaction from a human driver. In some implementations, a human operator can be included in the vehicle 104. In some implementations, a human operation can be omitted from the vehicle 104 (and/or also omitted from remote control of the vehicle 104).

The vehicle 104 can be configured to operate in a plurality of operating modes 108A-D. The vehicle 104 can be configured to operate in a fully autonomous (e.g., self-driving) operating mode 108A in which the vehicle 104 can drive and navigate with no input from a user present in the vehicle 104. The vehicle 104 can be configured to operate in a semi-autonomous operating mode 108B in which the vehicle 104 can operate with some input from a user present in the vehicle 104. The vehicle 104 can enter into a manual operating mode 108C in which the vehicle 104 is fully controllable by a user (e.g., human driver) and can be prohibited from performing autonomous navigation (e.g., autonomous driving). In some implementations, the vehicle 104 can implement vehicle operating assistance technology (e.g., collision mitigation system, power assist steering, etc.) while in the manual operating mode 108C to help assist the operator of the vehicle 104.

The vehicle 104 can also be configured to operate in a test trip operating mode 108D. The test trip operating mode 108D can enable the vehicle 104 to receive data indicative of one or more test trips and/or to implement one or more test trips, as further described herein. The vehicle 104 can enter into the test trip operating mode 108D, for instance, when the vehicle 104 is not providing a vehicle service and/or is in between instances of providing a vehicle service.

By way of example, the vehicle 104 can complete a trip during which the vehicle 104 transported an individual from one location to another in response to a transportation service request made by that individual. The vehicle 104 may not have another service request to address at that time. Thus, the vehicle 104 can enter into the test trip operating mode 108D such that the vehicle 104 is available to travel in accordance with a test trip (e.g., a trip that is not for providing a vehicle service). In some implementations, the vehicle 104 can be configured to enter into the test trip operating mode 108D as a fallback operating mode (e.g., when the autonomous vehicle is not addressing a service request, not receiving maintenance, etc.). In some implementations, the vehicle 104 can exit from the test trip operation mode 108D in the event that the vehicle 104 is assigned to provide a vehicle service for a service request.

The operating modes 108A-D of the vehicle 104 can be stored in a memory and/or data registrar onboard the vehicle 104. For example, the operations modes 108A-D can be defined by a data structure (e.g., rule, list, table, etc.) that indicates one or more operating parameters for the vehicle 104, while in the particular operation mode 108A-D. For example, the data structure can indicate that the vehicle 104 is to provide a communication to the operations computing system 106 when it enters into the test trip operating mode 108D. Moreover, the data structure can include a rule that indicates the vehicle 104 is to consider any test trip parameters associated with a test trip when planning the motion of the vehicle 104. The vehicle computing system 102 can access the memory and/or data registrar when implementing an operating mode 108A-D.

The operating mode 108A-D of the vehicle 104 can be adjusted in a variety of manners. In some implementations, the operating mode 108A-D of the vehicle 104 can be selected remotely, off-board the vehicle 104. For example, an entity associated with the vehicle 104 (e.g., a service provider) can utilize the operations computing system 106 to manage the vehicle 104 (and/or an associated fleet). The operations computing system 106 can send one or more control signals to the vehicle 104 instructing the vehicle 104 to enter into, exit from, maintain, etc. an operating mode. By way of example, the operations computing system 106 can send one or more control signals to the vehicle 104 instructing the vehicle 104 to enter into the test trip operating mode 108D. In some implementations, the operating mode 108A-D of the vehicle 104 can be set onboard and/or near the vehicle 104. For example, the vehicle computing system 102 can automatically determine when and where the vehicle 104 is to enter, change, maintain, etc. a particular operating mode (e.g., without user input). Additionally, or alternatively, the operating mode 108A-D of the vehicle 104 can be manually selected via one or more interfaces located onboard the vehicle 104 (e.g., key switch, button, etc.) and/or associated with a computing device proximate to the vehicle 104 (e.g., a tablet operated by authorized personnel located near the vehicle 104). In some implementations, the operating mode 108A-D of the vehicle 104 can be adjusted based at least in part on a sequence of interfaces located on the vehicle 104. For example, the operating mode 108A-D may be adjusted by manipulating a series of interfaces in a particular order to cause the vehicle 104 to enter into a particular operating mode 108A-D.

The vehicle computing system 102 can include one or more computing devices located onboard the vehicle 104. For example, the computing device(s) can be located on and/or within the vehicle 104. The computing device(s) can include various components for performing various operations and functions. For instance, the computing device(s) can include one or more processor(s) and one or more tangible, non-transitory, computer readable media (e.g., memory devices). The one or more tangible, non-transitory, computer readable media can store instructions that when executed by the one or more processor(s) cause the vehicle 104 (e.g., its computing system, one or more processors, etc.) to perform operations and functions, such as those described herein for controlling an autonomous vehicle.

As shown in FIG. 1, the vehicle 104 can include one or more sensors 112, an autonomy computing system 114, and one or more vehicle control systems 116. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The sensor(s) 112 can be configured to acquire sensor data 118 associated with one or more objects that are proximate to the vehicle 104 (e.g., within a field of view of one or more of the sensor(s) 112). The sensor(s) 112 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 118 can include image data, radar data, LIDAR data, and/or other data acquired by the sensor(s) 112. The object(s) can include, for example, pedestrians, vehicles, bicycles, and/or other objects. The object(s) can be located in front of, to the rear of, and/or to the side of the vehicle 104. The sensor data 118 can be indicative of locations associated with the object(s) within the surrounding environment of the vehicle 104 at one or more times. The sensor(s) 112 can provide the sensor data 118 to the autonomy computing system 114.

In addition to the sensor data 118, the autonomy computing system 114 can retrieve or otherwise obtain map data 120. The map data 120 can provide detailed information about the surrounding environment of the vehicle 104. For example, the map data 120 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle 104 in comprehending and perceiving its surrounding environment and its relationship thereto.

The vehicle 104 can include a positioning system 122. The positioning system 122 can determine a current position of the vehicle 104. The positioning system 122 can be any device or circuitry for analyzing the position of the vehicle 104. For example, the positioning system 122 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 104 can be used by various systems of the vehicle computing system 102 and/or provided to a remote computing device (e.g., of the operations computing system 106). For example, the map data 120 can provide the vehicle 104 relative positions of the surrounding environment of the vehicle 104. The vehicle 104 can identify its position within the surrounding environment (e.g., across six axes) based at least in part on the data described herein. For example, the vehicle 104 can process the sensor data 118 (e.g., LIDAR data, camera data) to match it to a map of the surrounding environment to get an understanding of the vehicle's position within that environment.

The autonomy computing system 114 can include a perception system 124, a prediction system 126, a motion planning system 128, and/or other systems that cooperate to perceive the surrounding environment of the vehicle 104 and determine a motion plan for controlling the motion of the vehicle 104 accordingly. For example, the autonomy computing system 114 can receive the sensor data 118 from the sensor(s) 112, attempt to comprehend the surrounding environment by performing various processing techniques on the sensor data 118 (and/or other data), and generate an appropriate motion plan through such surrounding environment. The autonomy computing system 114 can control the one or more vehicle control systems 116 to operate the vehicle 104 according to the motion plan.

The autonomy computing system 114 can identify one or more objects that are proximate to the vehicle 104 based at least in part on the sensor data 118 and/or the map data 120. For example, the perception system 124 can obtain state data 130 descriptive of a current state of an object that is proximate to the vehicle 104. The state data 130 for each object can describe, for example, an estimate of the object's: current location (also referred to as position); current speed (also referred to as velocity); current acceleration; current heading; current orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can create predicted data 132 associated with each of the respective one or more objects proximate to the vehicle 104. The predicted data 132 can be indicative of one or more predicted future locations of each respective object. The predicted data 132 can be indicative of a predicted path (e.g., predicted trajectory) of at least one object within the surrounding environment of the vehicle 104. For example, the predicted path (e.g., trajectory) can indicate a path along which the respective object is predicted to travel over time (and/or the speed at which the object is predicted to travel along the predicted path). The prediction system 126 can provide the predicted data 132 associated with the object(s) to the motion planning system 128.

The motion planning system 128 can determine a motion plan 134 for the vehicle 104 based at least in part on the predicted data 132 (and/or other data). The motion plan 134 can include vehicle actions with respect to the objects proximate to the vehicle 104 as well as the predicted movements. For instance, the motion planning system 128 can implement an optimization algorithm that considers cost data associated with a vehicle action as well as other objective functions (e.g., cost functions based on speed limits, traffic lights, etc.), if any, to determine optimized variables that make up the motion plan 134. By way of example, the motion planning system 128 can determine that the vehicle 104 can perform a certain action (e.g., pass an object) without increasing the potential risk to the vehicle 104 and/or violating any traffic laws (e.g., speed limits, lane boundaries, signage). The motion plan 134 can include a planned trajectory, speed, acceleration, other actions, etc. of the vehicle 104.

The motion planning system 128 can provide the motion plan 134 with data indicative of the vehicle actions, a planned trajectory, and/or other operating parameters to the vehicle control system(s) 116 to implement the motion plan 134 for the vehicle 104. For instance, the vehicle 104 can include a mobility controller configured to translate the motion plan 134 into instructions. By way of example, the mobility controller can translate a determined motion plan 134 into instructions to adjust the steering of the vehicle 104 "X" degrees, apply a certain magnitude of braking force, etc. The mobility controller can send one or more control signals to the responsible vehicle control component (e.g., braking control system, steering control system, acceleration control system) to execute the instructions and implement the motion plan 134.

The vehicle 104 can include a communications system 136 configured to allow the vehicle computing system 102 (and its computing device(s)) to communicate with other computing devices. The vehicle computing system 102 can use the communications system 136 to communicate with the operations computing system 106 and/or one or more other remote computing device(s) over one or more networks (e.g., via one or more wireless signal connections). In some implementations, the communications system 136 can allow communication among one or more of the system(s) on-board the vehicle 104. The communications system 136 can include any suitable components for interfacing with one or more network(s), including, for example, transmitters, receivers, ports, controllers, antennas, and/or other suitable components that can help facilitate communication.

The vehicle 104 can include one or more human-machine interfaces 139. For example, the vehicle 104 can include one or more display devices located onboard the vehicle 104. A display device (e.g., screen of a tablet, laptop, etc.) can be viewable by a user of the vehicle 104 that is located in the front of the vehicle 104 (e.g., driver's seat, front passenger seat). Additionally, or alternatively, a display device can be viewable by a user of the vehicle 104 that is located in the rear of the vehicle 104 (e.g., back passenger seat(s)).

In some implementations, the vehicle 104 can be associated with an entity (e.g., a service provider, owner, manager). The entity can be one that offers one or more vehicle service(s) to a plurality of users via a fleet of vehicles that includes, for example, the vehicle 104. In some implementations, the entity can be associated with only vehicle 104 (e.g., a sole owner, manager). In some implementations, the operations computing system 106 can be associated with the entity. The vehicle 104 can be configured to provide one or more vehicle services to one or more users. The vehicle service(s) can include transportation services (e.g., rideshare services in which user rides in the vehicle 104 to be transported), courier services, delivery services, and/or other types of services. The vehicle service(s) can be offered to users by the entity, for example, via a software application (e.g., a mobile phone software application). The entity can utilize the operations computing system 106 to coordinate and/or manage the vehicle 104 (and its associated fleet, if any) to provide the vehicle services to a user.

The operations computing system 106 can include one or more computing devices that are remote from the vehicle 104 (e.g., located off-board the vehicle 104). For example, such computing device(s) can be components of a cloud-based server system and/or other type of computing system that can communicate with the vehicle computing system 102 of the vehicle 104. The computing device(s) of the operations computing system 106 can include various components for performing various operations and functions. For instance, the computing device(s) can include one or more processor(s) and one or more tangible, non-transitory, computer readable media (e.g., memory devices). The one or more tangible, non-transitory, computer readable media can store instructions that when executed by the one or more processor(s) cause the operations computing system 106 (e.g., the one or more processors, etc.) to perform operations and functions, such as for coordinating vehicle test trips.

The operations computing system 106 can include one or more components configured to control the test trip(s) for one or more vehicles. For example, the operations computing system 106 can include an automatic test trip deployment system 140 that can coordinate the deployment of test trips to vehicles as well as the receipt of feedback data, as further described herein. A test trip is a trip during which the vehicle is to travel without providing a vehicle service. For example, a test trip can include a trip by which the vehicle 104 is to travel from one location to another location (and/or along a vehicle route) without providing a transportation service, delivery service, courier service, etc. to a customer of the service provider.

Figure 2:
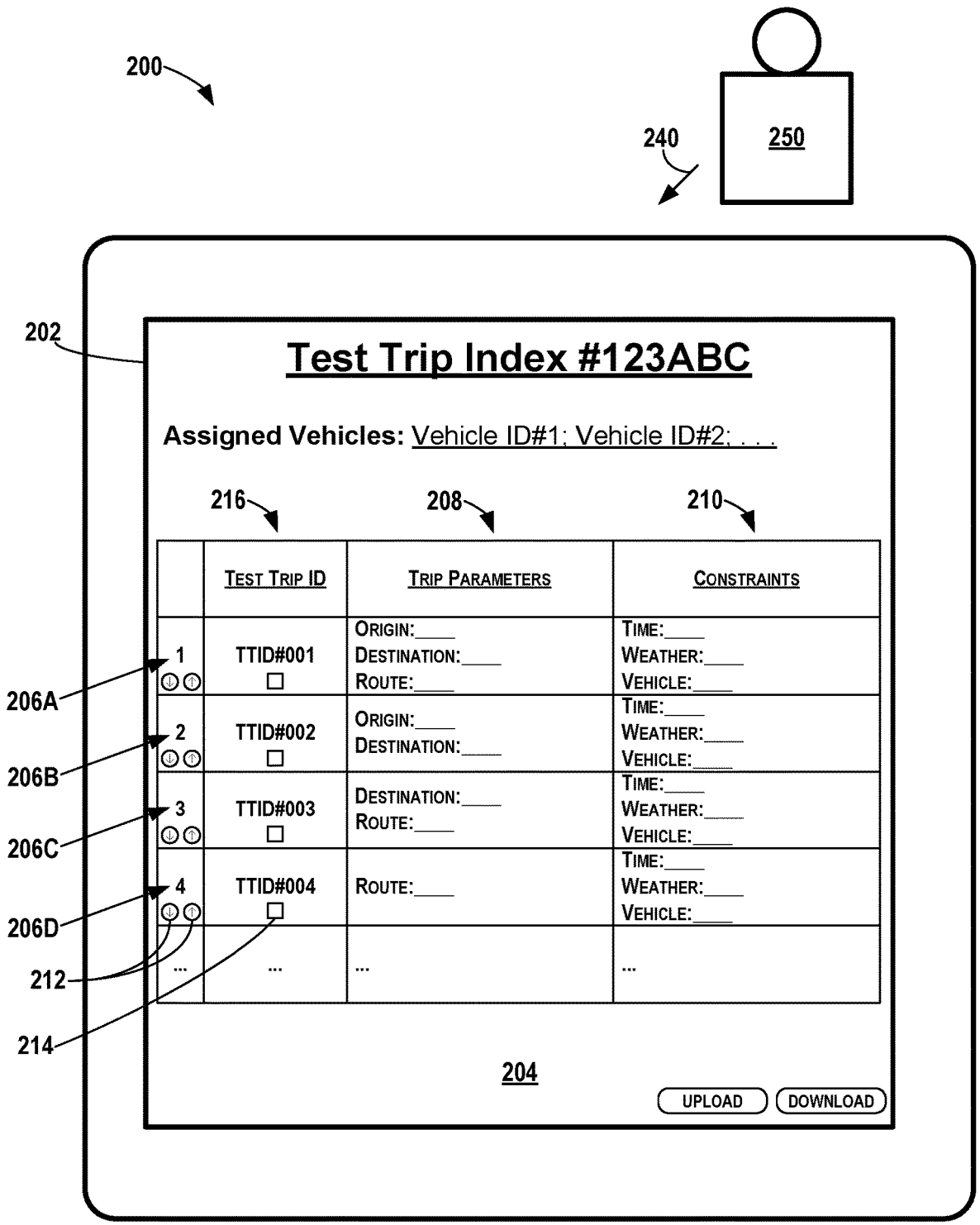
FIG. 2 depicts an example display device with an example user interface according to example embodiments of the present disclosure.

The vehicle 104 can be associated with a test trip index that includes a plurality of test trips. FIG. 2 depicts an example display device 200 with an example user interface 202 according to example embodiments of the present disclosure. The display device 200 (as well as the other display devices described herein) can include, for example, a screen and/or other visual output device of a computing device (e.g., desktop computer, laptop computer, tablet, phone, etc.). A test trip index 204 can be created based at least in part on user input 240 (e.g., from a user 250) associated with the user interface 202 displayed on the display device 200. A test trip index 204 can be a data structure (e.g., list, table, array, tree, rule, etc.) that includes a variety of information. For instance, the test trip index 204 can include a plurality of test trips 206A-D. The test trips 206A-D are not generated in response to a service request for a vehicle service provided by a vehicle 104 (e.g., a service request for a transportation service). Rather, the test trips 206A-D are intended to be implemented by a vehicle 104 that is not providing a vehicle service (e.g., while travelling in accordance with the test trip 206). A test trip 206A-D can be data that defines (at least partially) the travel to be undertaken by the vehicle 104 within a geographic area. For example, each of the test trips 206A-D can be associated with one or more test trip parameters 208 for a vehicle 104 to follow when travelling in accordance with the test trip 206A-D. In some implementations, the test trip parameter(s) 208 can include, for example, an origin location, a destination location, and/or a vehicle route for a vehicle 104 to follow.

The test trip index 204 can be customized by the user 250. For instance, the operations computing system 106 can provide data indicative of the test trip index 204 for display via the user interface 202 of the display device 200. The user 250 can visualize and/or customize the test trip index 204, the individual test trips 206A-D, the test trip parameters 208, and/or the other information included therein (e.g., via the user interface 202). For example, the plurality of test trips 206A-D (e.g., the test trip parameters 208) can be specified by a user 250 (e.g., test operator associated with the entity) based at least in part on user input 240 (e.g., touch input, keyboard input, voice input, cursor input, etc.) associated with the user interface 202 displayed on the display device 200. The user 250 can specify (e.g., create, select, add, delete, edit, adjust, modify, etc.) the plurality of test trips 206A-D and/or the associated test trip parameter(s) 208 that are included in the test trip index 204 by providing user input 240 with respect to the user interface 202. By way of example, the user 250 can create a first test trip 206A within the test trip index 204 via the user interface 202. The first test trip 206A can include an origin location (e.g., latitude-longitude coordinate pair, address, place name, etc.) and a destination location, each specified by the user 250. The first test trip 206A can include a vehicle route specified by the user 250. Additionally, or alternatively, the user 250 can create a second test trip 206B within the test trip index 204 via the user interface 202. The test trip parameters 208 of the second test trip 206B can include, for example, an origin and a destination. Additionally, or alternatively, the user 250 can create a third test trip 206C within the test trip index 204 via the user interface 202. The test trip parameters 208 of the third test trip 206C can include, for example, a destination and a vehicle route (e.g., for a vehicle to follow). Additionally, or alternatively, the user 250 can create a fourth test trip 206D within the test trip index 204 via the user interface 202. The test trip parameters 208 of the fourth test trip 206D can include, for example, a vehicle route. In some implementations, the vehicle route can be automatically added (e.g., by the operations computing system 106) to a test trip 206A-D based on the region, day, time range, etc. For example, in some implementations, when the operations computing system 106 deploys the test trip 206A-D to the vehicle 104, the operations computing system 106 can also determine and provide a vehicle route for the vehicle 104 to follow (e.g., based on the current traffic patterns, etc.), if no vehicle route is specified. Additionally, or alternatively, if no vehicle route is specified by the test trip parameters 208, the vehicle computing system 102 can determine the vehicle route onboard the vehicle 104.

In some implementations, the test trip index 204 can be associated with one or more constraints 210. The constraints 210 can be used, for example, to assign the test trip index 204 and/or the test trip(s) 206A-D to a vehicle, as further described herein. The one or more constraints 210 can include at least one of a time constraint, a weather constraint, a vehicle constraint, or another type of constraint. For example, the user 250 can specify (e.g., via user input 240) a time constraint indicating that one or more of the test trips 206A-D are to be implemented during a certain time of day (e.g., night time, day time, etc.). Additionally, or alternatively, the test trip index 204 can be associated with a weather constraint indicating that one or more of the test trips 206A-D are to be implemented during certain weather conditions (e.g., rain, snow, hail, clear, etc.). The test trip index 204 can also, or alternatively, be associated with a vehicle constraint indicating, for example, one or more type(s) of vehicles that are to receive the test trip(s) 206A-D (e.g., autonomous sport utility vehicles, vehicles with certain versions of software, etc.). In this way, the constraint(s) 210 can help a user 250 control the types of testing conditions associated with a test trip 206A-D.

The order of the deployment associated with the plurality of test trips 206A-D can be adjustable. For instance, a user 250 can provide user input 240 to specify the order in which the test trips 206A-D are to be deployed to a vehicle (and/or re-order a previously specified order). By way of example, the user 250 can provide user input 240 associated with one or more interface elements 212 to specify the order of deployment of the plurality of test trips 206A-D. Additionally, or alternatively, a user 250 can specify the order based on other user input (e.g., drag/drop action, etc.). Accordingly, the test trips 206A-D, the associated test trip parameter(s) 208, and/or the order of the test trip(s) 206A-D can be pre-determined by the user 250. In some implementations, the operations computing system 106 can determine the order and/or randomly select a test trip 206A-D to be deployed to a vehicle and/or select a test trip based on other criteria, as further described herein. The user 250 may specify that the order of test trips 206A-D deployment is to be determined and/or selected (e.g., at random, selectively) by the operations computing system 106 (and/or another system).

In some implementations, the test trip index 204 can include a plurality of test trips 206A-D, and the user 250 can select a certain subset of test trips (e.g., first test trip 206A, third test trip 206C) of plurality of test trips 206A-D for deployment to a vehicle. For example, the user 250 can provide user input 240 associated with a selectable element 214 (e.g., check box, etc.) to select the test trip(s) that the user 250 desires to be available for deployment to an associated vehicle. The user 250 can also, or alternatively, select a test trip 206A-D by any suitable manner. The unselected test trips may not be available to deployment to an associated vehicle, such that the operations computing system 106 (an/or another system) will not deploy the unselected test trip to a vehicle. In this way, the user 250 can specify one or more test trip(s) of a plurality of test trips 206A-D in a text trip index 204 for deployment, rather than having to create a new test trip index that includes only the desired subset.

In some implementations, the user 250 can upload and/or download information associated with a test trip index 204. For example, the user 250 can create (e.g., via a software application) a trip test index 204, one or more test trips 206A-D, test trip parameters 208, and/or other information in a file (e.g., comma separated format file, etc.), offline from the operation computing system 106 (and/or other system) that provides the user interface 202. The user 250 can upload the file to the operations computing system 106 (and/or another system) that provides the user interface 202. In such an implementation, the operations computing system 106 (and/or another system) can provide the uploaded test trip index 204 (and its contents) for display via the user interface 202 of the display device 200. The user 250 can customize the uploaded test trip index 204, as similarly described herein. Additionally, or alternatively, the user 250 can download a file associated with test trip index 204. In such an implementations, the user 250 can specify the test trip index 204 offline (and/or in another format) and upload such a test trip index 204. This may also allow a user 250 to provide test trip indices to another computing system (e.g., via email, other data transfer, etc.).

A user 250 can specify various types of other information associated with the test trip index 204. For example, in some implementations, each test trip 206A-D can be associated with a test trip identifier 216, as shown for example in FIG. 2. An identifier 216 (e.g., unique identifier) can include a character (e.g., number, letter, symbol, etc.) and/or plurality of characters that can be used to identify the associated test trip 206. In some implementations, the test trip index 204 can be associated with an identifier. The identifiers can be generated and/or assigned by the user 250 (e.g., via user input 240) and/or automatically by the operations computing system 106. Additionally, or alternatively, the user 250 can provide a name/title for the test trip index 204 and/or a description associated with the test trip index 204. This may be helpful when the user 250 (and/or another user) reviews and/or accesses the test trip index 204 at a later date.

Figure 3:
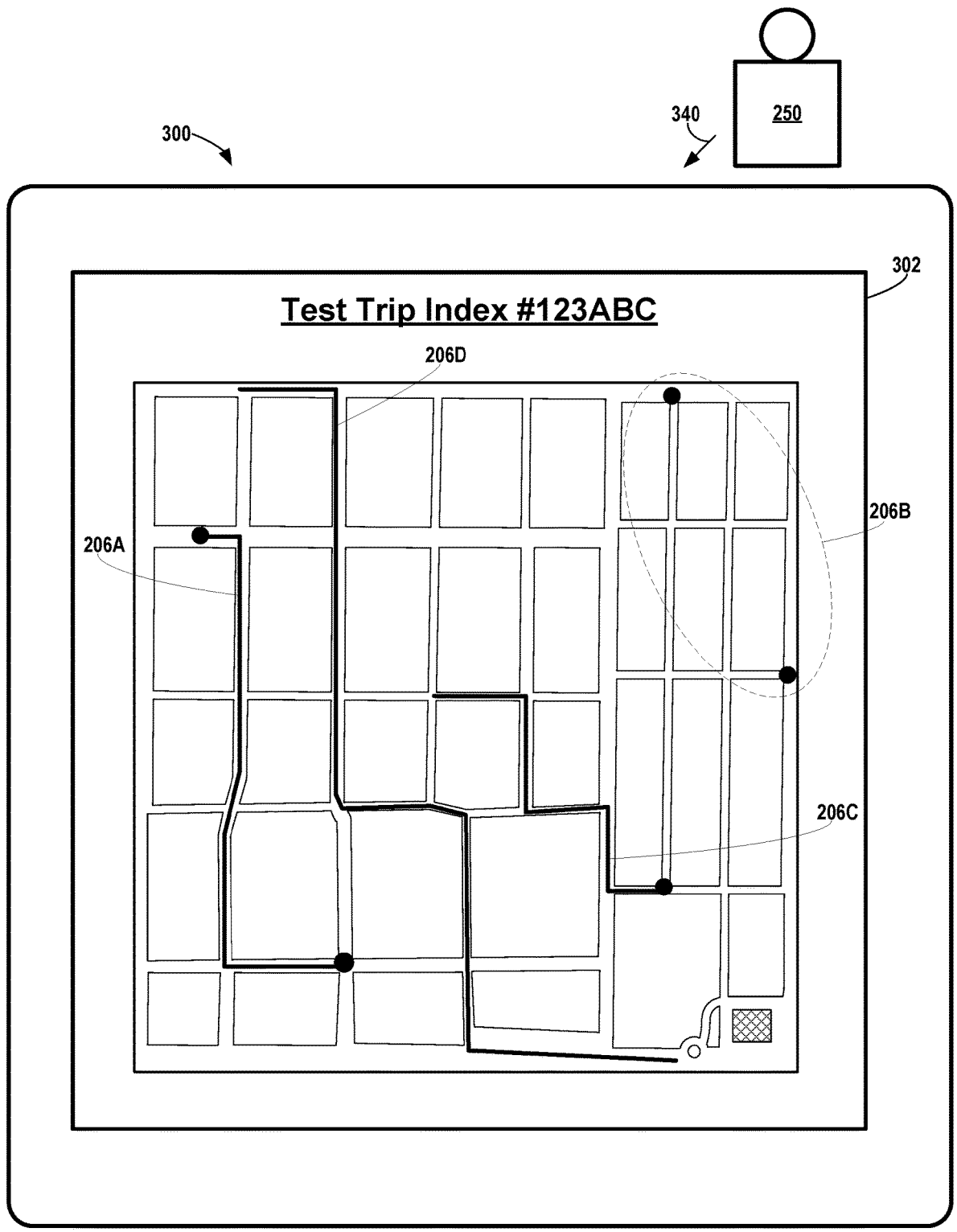
FIG. 3 depicts an example display device with an example map user interface according to example embodiments of the present disclosure.

In some implementations, the user interface (e.g., presented to the user 250) can include a map user interface. FIG. 3 depicts an example display device 300 with an example map user interface 302 according to example embodiments of the present disclosure. The display device 300 can be the same and/or different from the display device 200.

The map user interface 302 can depict a geographic area associated with the test trip index 204. For example, the geographic area can be an area in which a vehicle (e.g., to be associated with the trip index 204) is and/or will be driving and/or an area in which the user 250 desires to have one or more test trips implemented. The map user interface 302 can present the one or more of the test trips 206A-D and/or the associated test trip parameters 208. The user 250 can view the test trips 206A-D via the map user interface 302. The user 250 can view the test trip parameters 208 associated with a test trip 206A-D via the map user interface 302. For example, as shown, the map user interface 302 can present (and the user 250 can view) the origin, destination, and/or vehicle route of a test trip 206A-D via the map user interface 302. In some implementations, the user 250 can provide user input specifically directed to a test trip 206A-D (e.g., scroll over the test trip 206A-D) to view information associated with the specific test trip 206A-D and/or the test trip index 204 (e.g., identifiers, parameters, constraints, etc.).

In some implementations, the test trip parameters 208 (and/or constraints 210) can be specified by the user 250 based at least in part on user input 340 associated with the map user interface 302. For example, the user 250 can provide user input 340 (e.g., a pin drop action, other cursor action, keystroke action, etc.) associated with the map user interface 302 to specify the origin and/or destination for a particular test trip 206A-D. Additionally, or alternatively, the user 250 can provide user input 340 (e.g., a draw action, other cursor action, drag action, etc.) associated with the map user interface 302 to specify the vehicle route for a particular test trip 206A-D.

In some implementations, the test trip index 204, the test trips 206A-D, and/or the test trip parameters 208, the constraints 210, and/or other information associated with the test trip index 204 can be specified by a computing system, without the user input 240, 340 to a user interface 202, 302. For instance, the operations computing system 106 can be configured create the test trip index 204, the test trips 206A-D, and/or the test trip parameters 208, the constraints 210, and/or other associated information (e.g., for a given vehicle or a plurality of vehicles) without presenting the user interface(s) 202, 302 and/or obtaining data indicative of user input 240, 340 associated with the user interface(s) 202, 302. In some implementations, the operations computing system 106 can create one or more of the test trip parameters 208, in real-time and/or near real-time (e.g., while the vehicle 104 is in the test trip operating mode 108D). By way of example, the test trip parameters 208 can include, for example, an origin location that is a first location within a geographic area that is selected (e.g., randomly) by the operations computing system 106 (e.g., a latitude longitude coordinate pair, an address, a place name, etc.) and destination location that is a second location within a geographic area that is selected (e.g., randomly) by the operations computing system 106 (e.g., a latitude longitude coordinate pair, an address, a place name, etc.). The selected origin location can be different from the selected destination location. In some implementations, the vehicle route can be randomly selected (e.g., in real-time, near real-time).

In some implementations, the test trips 206A-D of the test trip index 204 can be based at least in part on historical data. The operations computing system 106 can obtain data indicative of one or more previous vehicle trips taken by the fleet of vehicles when providing vehicle services (e.g., vehicle trips previously travelled in response to a transportation service request, etc.). This can be a service trip previously performed by the vehicle(s) assigned to the test trip index 204 and/or previously performed by another vehicle. The operations computing system 106 can generate a test trip index 204, test trip(s) 206A-D, test trip parameter(s) 208, and/or constraints 210 based at least in part on these previously travelled vehicle trips. Accordingly, at least one of the test trips 206A-D can be based at least in part on a vehicle trip previously travelled in response to a service request. By way of example, a test trip can include an origin, destination, and/or a vehicle route that is similar to (or the same as) that of a trip performed by a vehicle for a transportation service (e.g., from the pick-up origin location, to the drop-off destination location). In some implementations, the test trip may be performed under the same conditions/constraints (e.g., during the day, clear skies, etc.) as the actual vehicle trip. In this way, one or more of the test trips 206A-D of the test trip index 204 can be formulated to reflect actual vehicle trips that a vehicle has taken in response to a service request, which can help improve the efficacy of the test trip. In some implementations, the test trip may be performed under different conditions/constraints (e.g., during night time, in the rain, etc.) than the actual vehicle trip. This can allow the operations computing system 106 to gather test data that may not have previously existed.

In some implementations, a test trip 206A-D can be associated with a geographic area (or a portion thereof) for which there is minimal or limited data. For example, the operations computing system 106 (and/or an entity associated therewith) may have limited data (or no data) associated with a portion of the geographic area (e.g., a neighborhood) during a particular time of day (e.g., at night), under certain conditions (e.g., during rain), etc. To help address this deficiency, one or more of the test trips 206A-D can include test trip parameters 208 and/or constraints 210 that will cause a vehicle to travel within this portion of the geographic area at the particular time of day and/or under the certain conditions to obtain data (e.g., sensor data, perception data, etc.) that can be used to build a further understanding of that portion of the geographic area.

Returning to FIG. 2, the test trip index 204 can be associated with (e.g., assigned to) a vehicle, such as vehicle 104. For instance, a user 250 can provide user input 240 associated with the user interface 202 (e.g., keystroke entry, drop down menu, browse function, etc.) in order to associate the test trip index 204 to the vehicle 104. The vehicle 104 can be associated with the test trip index 204 in that it is assigned to, linked to, identified with, and/or otherwise associated with the test trip index 204 such that a computing system (e.g., the operations computing system 106) can recognize that the vehicle 104 is to be provided with one or more test trips 206A-D from the test trip index 204 when appropriate, as further described herein. The vehicle 104 can be associated with the entire test trip index 204 (e.g., with all the test trips 206A-D) and/or one or more individual test trip(s) 206A-D (e.g., a subset of the test trips 206A-D). In some implementations, the vehicle 104 can be associated with a test trip index 204 for a particular time frame (e.g., day, week, month, year, etc.). By associating the vehicle 104 with the test trip index 204, the user 250 can by-pass the typical matching process used to match vehicles to trips generated in response to service requests. The operations computing system 106 can obtain data indicative of the association of the vehicle 104 to the test trip index and record, update, and/or store the test trip index 204 in an accessible memory/data registrar in a manner to indicate the association of the vehicle 104 with the test trip index 204. For example, the test tip index 204 can be stored with a vehicle identifier, with a link/pointer to a vehicle identifier, with metadata indicative of the vehicle 104, with a data field indicative of the vehicle 104, and/or using other approaches to identify the associated with the vehicle 104.

The associated vehicle 104 can be a vehicle that the user 250 desires to implement one or more of the test trips 206A-D. For example, the user 250 can associate a particular test trip index 204 and/or test trip(s) 206A-D to a vehicle that has recently been equipped with hardware (e.g., sensor hardware, etc.) and/or software (e.g., motion planning software, etc.) that the user 250 desires to test. This can allow the user 250 to customize how and where vehicle(s) utilize the additional hardware and/or software to help determine the performance associated therewith. Additionally, or alternatively, the user 250 can associate a particular test trip index 204 and/or test trip(s) 206A-D to vehicle(s) that are located within a geographic area (e.g., new neighborhood) for which the user 250 desires to obtain additional data (e.g., sensor data for mapping a geographic area). For example, as described herein, such a geographic area can be an area with which the entity (e.g., associated with the operations computing system 106) has limited or no data (e.g., sensor data, mapping data, etc.). Accordingly, the user 250 can customize how and where vehicle(s) gather data associated with the geographic area of interest.

In some implementations, the test trip index 204 can be associated with a particular vehicle based at least in part on the type of vehicle. For example, the user 250 may desire that a sedan traverse a particular terrain within a geographic area to determine whether such terrain would be navigable by that type of vehicle (e.g., in fully autonomous mode). This can allow the user 250 the flexibility to test certain types of vehicles, under certain types of conditions.

In some implementations, a user 250 may associate a vehicle 104 to the test trip index 204 based at least in part on previously performed test trip(s). For example, the user interface 202 and/or the map user interface 302 can present information associated with a vehicle's previously performed test trips. The user interface 202 can present, for instance, a summary of the vehicle(s) previously associated with a test trip index 204 and/or the previous test trip(s) performed by a vehicle (or a plurality of vehicles). The user 250 can view the test trips that have been deployed and/or completed by a particular vehicle 104. Such information can also, or alternatively, be presented on a map user interface 302 in a manner similar to that shown in FIG. 3. In some implementations, the user interface 202 and/or the map user interface 302 can indicate how many/which of the test trips have been completed, how many/which of the test trips are incomplete, how many/which of the test trips have been rejected (if any), and/or any other status of the test trips 206A-D. The user 250 can view which of the test trip(s) 206A-D have been previously performed by the vehicle 104. In the event that the vehicle 104 has already performed the test trips 206A-D, the user 250 may decide not to associate the vehicle 104 with the test trip index 204. Additionally, or alternatively, the user 250 can disassociate the vehicle 104 with the trip test index 204 and/or one or more of the test trips 206A-D (e.g., de-select the vehicle 104, remove from a list, etc.).

In some implementations, the test trip index 204 can be associated with a plurality of vehicles. For example, the user 250 can associate the test trip index 204 with a plurality of vehicles (e.g., each operating within a geographic area of interest, each of a desired vehicle type, etc.). The operations computing system 106 can store the test trip index 204 (e.g., in an accessible memory) as associated with the plurality of vehicles. In such implementations, the operations computing system 106 can determine which of the plurality of vehicles is to be associated with the test trips 206A-D of the test trip index based on a variety of factors (e.g., vehicle availability, geographic location, vehicle condition, etc.).

Figure 4:
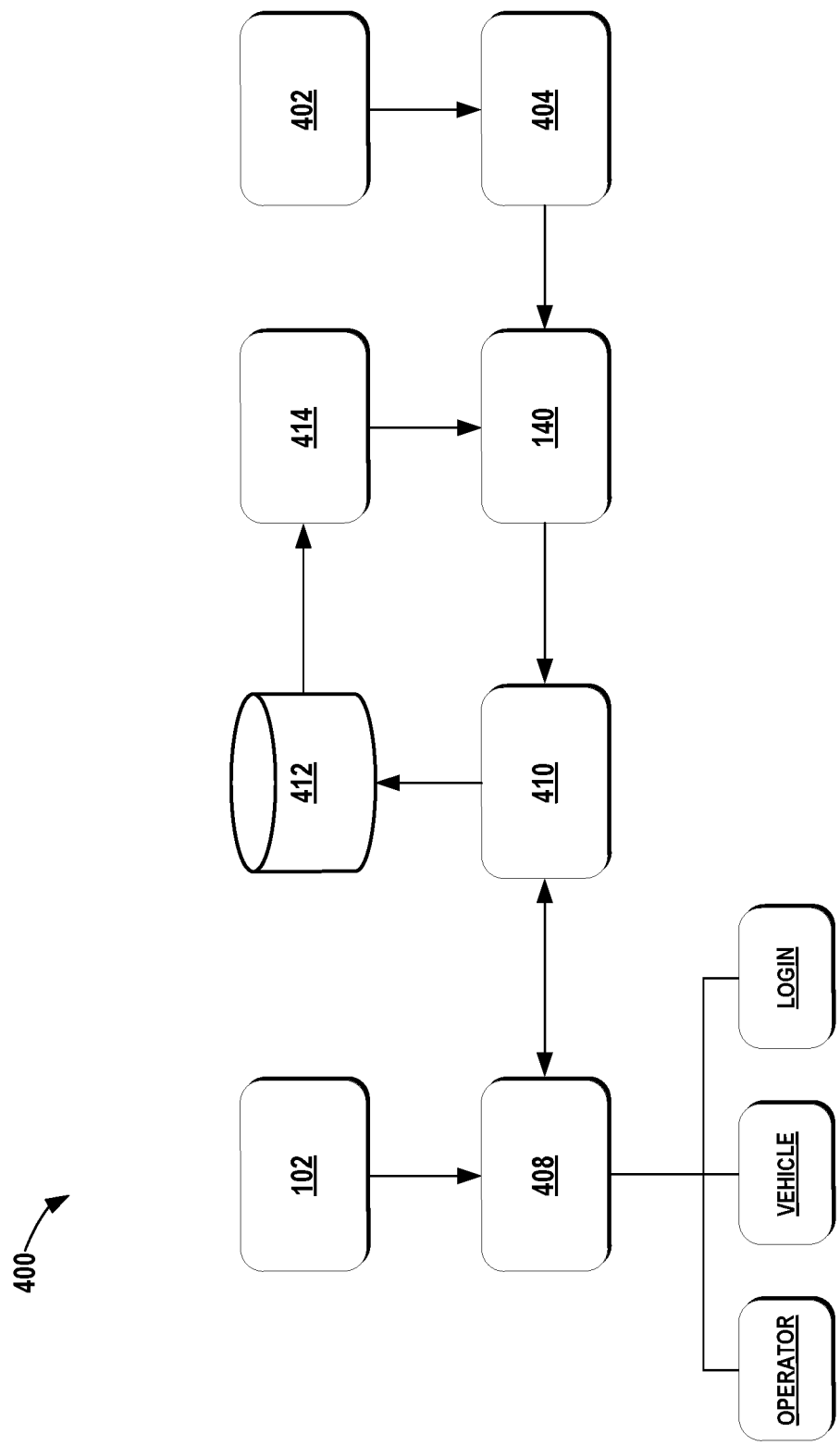
FIG. 4 depicts an example computing system for controlling autonomous vehicle test trips according to example embodiments of the present disclosure.

FIG. 4 depicts an example computing system 400 for controlling autonomous vehicle test trips according to example embodiments of the present disclosure. The system 400 can include one or more processors and/or one or more memory devices and instructions that when executed by the one or more processors cause the computing system to perform operations, as described herein. One or more of the components (e.g., 402, 140, 408-414) of the system 400 can be included as at least a portion of, for example, the operations computing system 106. The operations computing system 106 can utilize these components to automatically deploy one or more test trips 206A-D of a test trip index 204 to a vehicle 104, to cause the vehicle 104 to travel in accordance with the test trip(s) 206A-D.

The system 400 can create an assignment for the vehicle 104 based on the test trip index 204. For example, a front-end computing system 402 can be configured to present the user interface 202 and/or the map user interface 302 on a display device 200, 300 associated with the front-end computing system 402. As described herein, a test trip index 204 can be created, for example, based at least in part on user input 240 of the user 250 associated with the user interface 202 (and/or the map user interface 302) that is provided to the front-end computing system 402. Moreover, the user 250 can provide user input 240 indicating that at least the vehicle 104 is to be assigned to the test trip index 204. The front-end computing system 402 (e.g., of the operations computing system 106) can assign the test trip index 204 with the vehicle 104 based at least in part on the user input 240 associated with the user interface 202 (and/or map user interface 302) displayed on the display device 200, 300.

The front-end computing system 402 can obtain the data associated with the test trip index 204 and its association with the vehicle 104 and provide the data for storage in a back-end computing system 404. The back-end computing system 404 can include at least an accessible memory (e.g., a CRUD persistent storage, etc.) that can store the data associated with the test trip index 204 and/or metadata associated therewith. For example, the back-end computing system 404 can store data indicative of the test trip(s) 206A-D of the test trip index, the test trip parameters 208, constraints 210, the assigned vehicle 104, and/or other information. The back-end computing system 404 can be accessible by the automatic test trip deployment system 140 to deploy a test trip to the vehicle 104.

The vehicle 104 can become available (e.g., go on-line) to travel in accordance with at least one of the test trips 206A-D of the test trip index 204. For example, in the event that the vehicle 104 includes a human operator onboard the vehicle 104, the human operator can log-in via an application programming interface (API) 408 (e.g., stored onboard the vehicle 104, at the operations computing system 106, and/or another computing system). The application programming interface 408 can set forth instructions for communicating with the vehicle 104 (e.g., the vehicle computing system 102) and/or the operations computing system 106 (e.g., and/or its components). The human operator can be authenticated as an operator of the vehicle 104. In the event that the vehicle 104 does not include a human operator onboard the vehicle 104, the vehicle computing system 102 can call the application programming interface 408 to indicate that the vehicle 104 is available to travel in accordance with at least one of the test trips 206A-D of the test trip index 204 (e.g., without a user log-in process). This may occur, for instance, when the vehicle 104 is not performing (or assigned to perform) a trip in accordance with a vehicle service (e.g., transporting an individual, delivering an item, couriering an item, etc.). In some implementations, the vehicle 104 can enter into the test trip operating mode 108D when it is available to travel in accordance with a test trip, as described herein.

The vehicle computing system 102 can provide data indicating that vehicle 104 is available to travel in accordance with at least one test trip to a deployment system 410 (e.g., the standard vehicle service trip deployment system) via the application programming interface 408 (e.g., when in the test trip operating mode 108D). The deployment system 410 can obtain such data and provide it to a platform 412 (e.g., kafka processing platform) that is accessible and/or otherwise associated with an event-processing system 414. The platform 412 can provide an event to the event-processing system 414 indicating that the vehicle 104 is available for a test trip 206A-D. In response, the event processing system 414 can proxy the vehicle computing system 102 onto the automatic test trip deployment system 140. The automatic test trip deployment system 140 can obtain the data indicating that the vehicle 104 is available to travel in accordance with at least one of the test trips 206A-D of the test trip index 204 (e.g., via the event-processing system 414, the platform 412, etc.).

The automatic test trip deployment system 140 can automatically deploy a test trip 206A-D of the test trip index 204 to the vehicle 104. For instance, the automatic test trip deployment system 140 can obtain data indicative of a test trip index 204 associated with the vehicle 104 from an accessible memory in which such data is stored (e.g., associated with the back-end computing system 404). The data indicative of a test trip index 204 can include, for example, one or a plurality of test trips 206A-D and the one or more test trip parameters 208 associated with each of the test trip(s).

The automatic test trip deployment system 140 can select, from the test trip index 204, at least one first selected test trip for the vehicle 104. For example, as described herein, a user 250 can specify an order for the test trips 206A-D of the test trip index 204 to be deployed to the vehicle 104. The automatic test trip deployment system 140 can select a first selected test trip (e.g., 206A) based at least in part on the order specified in the test trip index 204 (e.g., by the user 250). Additionally, or alternatively, the automatic test trip deployment system 140 can select a test trip based at least in part on the status of the test trip. For example, the automatic test trip deployment system 140 can select the first test trip in test trip index 204 that has not yet been performed by the vehicle 104 (e.g., the first test trip of the order presented in the test trip index 204 that has an incomplete status). Additionally, or alternatively, the automatic test trip deployment system 140 can select a trip test based at least in part on a geographic location of the vehicle 104 (e.g., such that the origin of the test trip is convenient for the vehicle 104 and the miles travelled and/or the impact on the environment can be minimized). Additionally, or alternatively, the automatic test trip deployment system 140 can select a test trip based on the one or more constraint(s) 210 associated with the test trip. For example, in the event that the time of day and/or the weather match the time and/or weather constraints of a particular test trip, the automatic test trip deployment system 140 may select that test trip with the matching constraints. In such an implementation, the automatic test trip deployment system 140 may disregard the order of the test trips in the test trip index 204. In some implementations, the automatic test trip deployment system 140 can randomly select a test trip of the test trip index 204 for the vehicle 104.

The automatic test trip deployment system 140 can provide data indicative of the first selected test trip to the vehicle 104. For instance, the automatic test trip deployment system 140 can provide data indicative of the first selected test trip 206A to another computing system, such as the deployment system 410. The data indicative of the selected test trip 206A can include the trip parameter(s) 208 associated with the first selected test trip 206A (e.g., origin location, destination location, vehicle route, etc.). The deployment system 410 can deploy data indicative of the selected test trip 206A (e.g., indicative of the test trip parameters) to the vehicle 104, via the application programming interface 408, in a manner similar to how a trip associated with a vehicle service would be deployed to the vehicle 104. This can also improve the efficacy of the test trip process by simulating typical trip deployment processes, however, without the service request matching process. In some implementations, the automatic test trip deployment system 140 can provide data indicative of the selected test trip 206A (e.g., the test trip parameters 208 associated therewith) directly to the vehicle 104 (e.g., via the application programming interface 408).

In some implementations, the vehicle 104 can accept or reject the selected test trip 206A. For instance, in the event that the vehicle 104 includes a human operator, the human operator can be prompted to accept or reject the selected test trip 206A (e.g., via a user interface presented on a human-machine interface 139 of the vehicle 104). For example, the human operator may reject the selected test trip 206A in the event that the vehicle 104 requires maintenance. In the event that there is no human operator present in the vehicle 104, the vehicle computing system 102 can be configured to automatically accept or reject the selected test trip 206A. For example, the vehicle computing system 102 could reject the selected test trip 206A if a high percentage of the selected test trip 206A could not be navigated within a fully autonomous operating mode 108A. In some implementations, the data indicative of the selected test trip 206A provided to the vehicle 104 can include metadata that forces the vehicle 104 to accept the selected test trip 206A (e.g., such that it cannot be rejected by the human operator, the vehicle computing system 102, etc.).

The first selected test trip 206A can be provided to the vehicle computing system 104 at a variety of times. In some implementations, the first selected test trip 206A can be provide to the vehicle computing system 102 after the vehicle 104 has entered into the test trip operating mode 108D (e.g., after the vehicle 104 has finished providing a vehicle service). Additionally, or alternatively, the first selected test trip 206A can be preemptively deployed to the vehicle 104. For example, data indicative of the first selected test trip 206A can be provided to the vehicle 104 while the vehicle 104 is providing a vehicle service and/or before the vehicle 104 enters into the test trip operating mode 108D. The first selected test trip 206A can be stored in an accessible memory onboard the vehicle 104. In this way, a selected test trip 206A can be pre-queued for implementation by the vehicle 104.

The vehicle 104 can travel in accordance with the first selected test trip 206A (e.g., the test trip parameter(s) associated with the first selected test trip 206A). To do so, the vehicle computing system 102 can generate a motion plan 134 onboard the vehicle 104 based at least in part on the trip parameter(s) 208 associated with the first selected test trip 206A. For example, in the event that the test trip parameter(s) 208 indicate an origin location and a destination location, the vehicle computing system 102 can implement a motion plan 134 to navigate the vehicle 104 through its surrounding environment from the origin location to the destination location. In the event that the test trip parameter(s) 208 include a vehicle route, the vehicle computing system 102 can implement a motion plan 134 to navigate the vehicle 104 through the vehicle's surrounding environment along the vehicle route. When the vehicle 104 has completed the first selected test trip 206A, the vehicle computing system 102 can provide data to the deployment system 410 (and/or another system) via the application programming interface 408, to indicate that the first selected test trip 206A has ended and/or that the vehicle 104 is available for another test trip.

In some implementations, the automatic test trip deployment system 140 can be configured to deploy additional test trip(s) to the vehicle 104, if available. For example, the automatic test trip deployment system 140 can obtain data indicating that the vehicle 104 has completed the first selected test trip 206A (e.g., via the event processing system 414). The automatic test trip deployment system 140 can select a second selected test trip (e.g., 206B) from the test trip index 204 for the vehicle 104 (e.g., the next test trip in the order, a randomly selected trip, a test trip meeting the constraints, etc.). The automatic test trip deployment system 140 can provide data indicative of the second selected test trip 206B to the vehicle 104, in a similar manner as described herein (e.g., via the application programing interface 408). In some implementations, such data can be provided to the vehicle 104 before the vehicle 104 completes the first selected test trip 206A. The vehicle 104 can travel in accordance with the second test trip 206B (e.g., the test trip parameter(s) associated with the second selected test trip 206B). For example, the vehicle computing system 102 can implement a motion plan 134 that is based at least in part on the test trip parameters 208 associated with the second selected test trip 206B. In some implementations, the operations computing system 106 can deploy a plurality of test trips to the vehicle 104 at a time and the vehicle 104 can execute the test trips until they are complete (e.g., in a particular order, by convenience, etc.). In some implementations, in the event the vehicle 104 completes all the test trips 206A-D of a test trip index 204, the vehicle 104 can repeat the test trips 206A-D (e.g., in a loop process). In the event that the vehicle is not available for another test trip (e.g., because the vehicle 104 has been assigned to a vehicle service request), the vehicle computing system 102 can provide data indicating that the vehicle 104 is no longer available to travel in accordance with a test trip (e.g., that the vehicle 104 is no longer in the test trip operation mode 108D). As such, automatic test trip deployment system 140 can cease deploying test trips to the vehicle 104.

The operations computing system 106 can obtain feedback data associated with a selected test trip (e.g., 206A). In some implementations, the vehicle computing system 102 can record the feedback data as it is travelling in accordance with the test trip and can provide the feedback data to the operations computing system 106 (e.g., continuously, in real-time, near real-time, periodically, as scheduled, etc.). Additionally, or alternatively, the operations computing system 106 can monitor the vehicle 104 (e.g., in real-time, near real time, periodically, etc.) to obtain the feedback data. The feedback data can include data associated with the vehicle 104 and/or the surrounding environment of the vehicle 104, before, during, and/or after the vehicle 104 travels in accordance with the selected test trip. In some implementations, the feedback data can be indicative of one or more vehicle operating conditions during the test trip. For example, the feedback data can be indicative of a measurement (e.g., time, distance, percentage, etc.) of how much the vehicle 104 travelled without manual human user control during the test trip (e.g., fully autonomous operation). Additionally, or alternatively, the feedback data can be indicative of a measurement of how much the vehicle 104 travelled with manual human user control during the test trip (e.g., human user assisted operation). The feedback data can also, or alternatively, be indicative of a status of the test trip (e.g., completed, incomplete, in progress, not taken, etc.). In some implementations, the feedback data can indicate which vehicle(s) a test trip has been deployed to, which vehicle(s) have implemented the test trip, when a test trip was deployed/implemented, location(s) associated with the vehicle(s) and/or the test trip, etc. Additionally, or alternatively, the feedback data can include data that can be used to evaluate sensor performance, autonomy computing system performance, generate maps of navigated geographic areas, etc. This can include sensor data 118, state data 130, prediction data 132, data associated with a motion plan 134, and/or other data (e.g., acquired by the vehicle 104).

Figure 5:
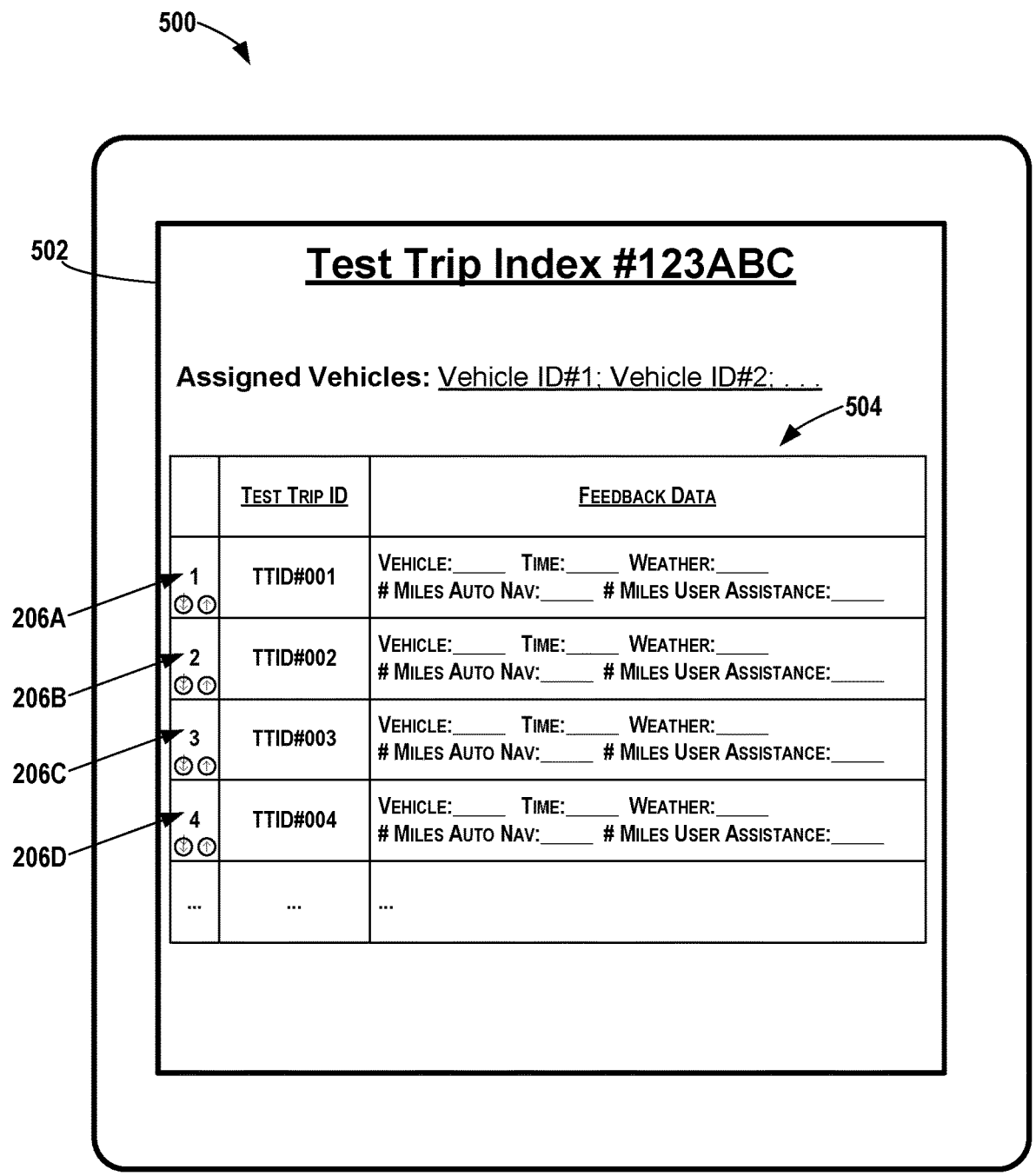
FIG. 5 depicts an example display device with an example user interface according to example embodiments of the present disclosure.

The operations computing system 106 (e.g., a front-end computing system component 402) can present the feedback data via a user interface on a display device, such that a user can visualize the feedback data. FIG. 5 depicts an example display device 500 with an example user interface 502 according to example embodiments of the present disclosure. Such a display device 500 and/or user interface 502 can be the same as or different from the display device 200, 300 and/or user interface 202, 302 used to help create the test trip index 204. Feedback data 504 can be presented via the user interface 502.

As shown in FIG. 5, the user interface 502 can present a variety of feedback data 504. The feedback data 504 can indicate, for example, the vehicle 104 that performed the test trip 206A-D and/or one or more times associated with the test trip 206A-D (e.g., the deployment time, time duration of performance, time range of performance, time of completion, etc.). As described herein, in some implementations, the feedback data 504 associated with at least one test trip can be indicative of at least one of a measurement of how much the vehicle 104 travelled without manual human user control during the at least one test trip, a measurement of how much the autonomous vehicle travelled with manual human user control during the at least one test trip, or a status of the at least one test trip. In some implementations, the feedback data 504 can include more granular information. For example, the feedback data 504 can include data for a portion/segment of a test trip (e.g., a measurement of how much the vehicle 104 travelled without manual human user control during the portion/segment, a measurement of how much the autonomous vehicle travelled with manual human user control during the portion/segment, or a status of the portion/segment). In some implementations, the feedback data 504 can include additional information associated with the test trip 206A-D such as, for example, the weather conditions associated with a particular test trip 206A-D.

The feedback data 504 can be presented in a variety of manners. For example, the feedback data 504 can be presented for a particular test trip index 204 (e.g., summary data for the test trip index 204). This can include data indicative of the vehicle(s) associated with the test trip index 204, summary information about the number of times the included test trips have been performed (and by which vehicles), and/or other information. Additionally, or alternatively, the feedback data 504 can be presented per test trip 206A-D (e.g., summary data by test trip). The feedback data 504 can be presented for one or more and/or each of the test trips 206A-D in the test trip index 204, to the extent that the feedback data 504 exists for that test trip 206A-D. This can include data indicative of the vehicle(s) that performed the particular test trip 206A-D, times, etc. In some implementations, the feedback data 504 can be presented for a particular vehicle (e.g., 104). This can include, for example, data indicative of the one or more test trip indices associated with the vehicle 104, test trips performed by a particular vehicle 104, the trip parameters associated therewith, etc.

Figure 6:
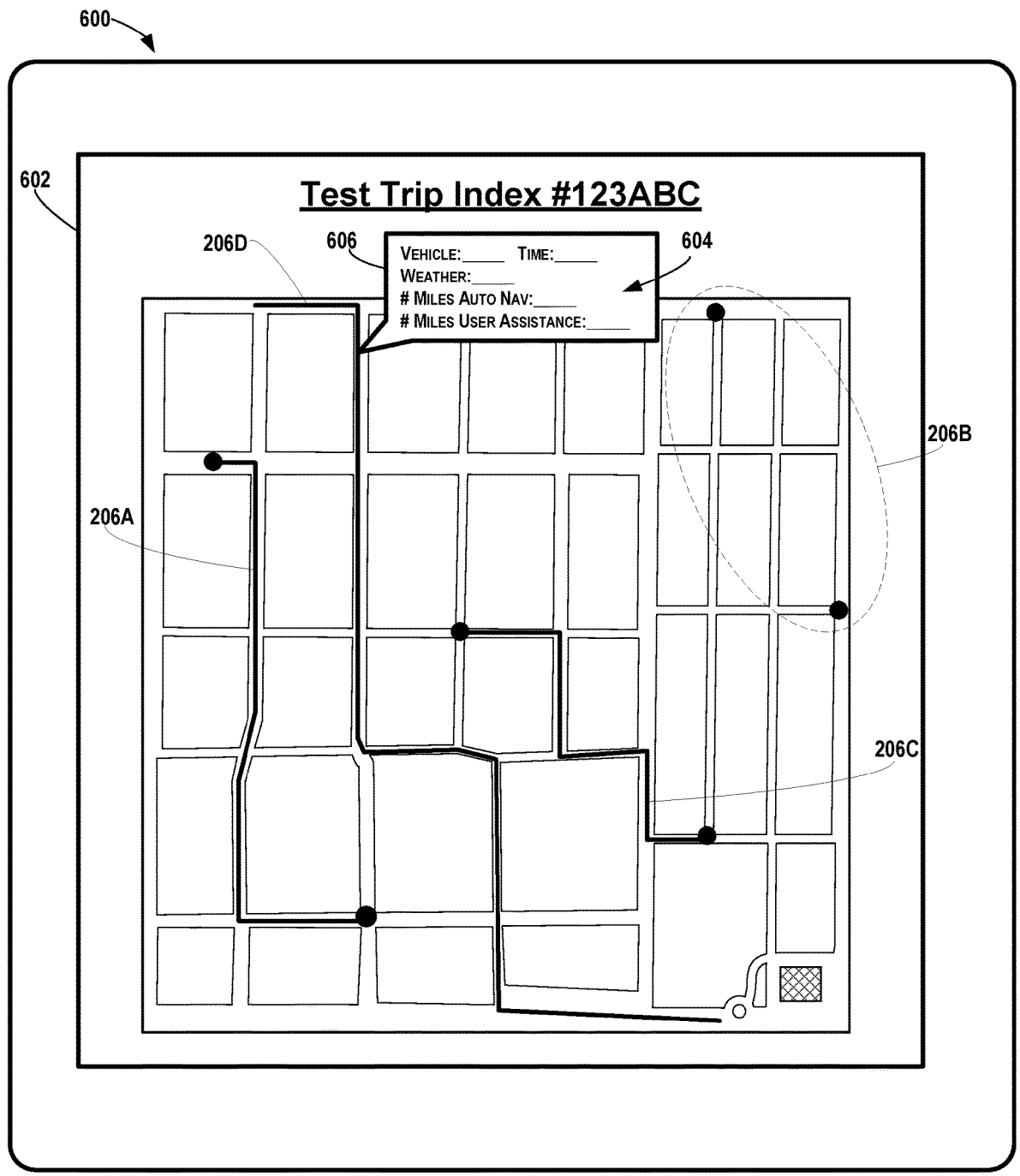
FIG. 6 depicts an example display device with an example map user interface according to example embodiments of the present disclosure.

In some implementations, the feedback data can be presented via a map user interface. FIG. 6 depicts an example display device 600 with an example map user interface 602 according to example embodiments of the present disclosure. The map user interface 602 can be similar (or different) than the map user interface 302 used to create the test trip index 204. The map user interface 602 can include a geographic area in which one or more of the test trips 206A-D have been and/or are to be performed. The map user interface 602 can indicate the test trip parameters 208 associated with the particular test trip 206A-D. The map user interface 602 can also include feedback data 604 associated with the test trip index 204 and/or an individual test trip 206A-D. The feedback data 604 presented on the map user interface 602 can include any of the feedback data described herein. The map user interface 602 can present the feedback data 604 when it is launched and/or in response to user input with respect to the map user interface 602. For instance, a user can provide user input (e.g., a scroll over cursor action) with respect to at least one of the test trips 206A-D presented in the map user interface 602. The feedback data 604 can be presented by the map user interface 602 based on the user input. For example, the map user interface 602 can include an element 606 (e.g., widget, box, etc.) that is displayed in response to the user input. The element 606 can present feedback data 604. In some implementations, the feedback data 604 can be presented without the need for such user input.

In some implementations, a computing system can process the feedback data 504, 604 to evaluate vehicle performance. For instance, the operations computing system 106 can obtain the feedback data 504, 604 as described herein. The operations computing system 106 can determine the performance of the vehicle 104 based at least in part on the feedback data 504, 604. By way of example, the operations computing system 106 can evaluate the feedback data 504, 604 across multiple, different test trips and/or across multiple performances of the same test trip. The operations computing system 106 can determine if the vehicle's performance (e.g., associated with certain hardware, software, etc.) is improving over time. An improvement in vehicle performance can be indicated by, for example, an increase in the amount of time, distance, percentage, etc. the vehicle 104 is operating without manual human operator control input (e.g., operating in a fully autonomous mode 108A).

The operations computing system 106 can provide a recommendation based at least in part on the feedback data 504, 604. For example, in the event that the vehicle's performance is not increasing over time, the operations computing system 106 can recommend that the vehicle 104 and/or a particular vehicle component (e.g., newly implemented hardware, software, existing hardware/software, etc.) be further evaluated (e.g., to troubleshoot for errors). In some implementations, the operations computing system 106 can provide a recommendation associated with the geographic area in which a test trip is operated. For example, in the event that vehicle(s) are consistently traversing a particular portion (e.g., block, street, etc.) of the geographic area with manual operator assistance despite increased data associated with that portion, the operations computing system 106 can suggest a further examination of that portion of the geographic area (e.g., on-sight visit, aerial imagery, etc.).

Figure 7:
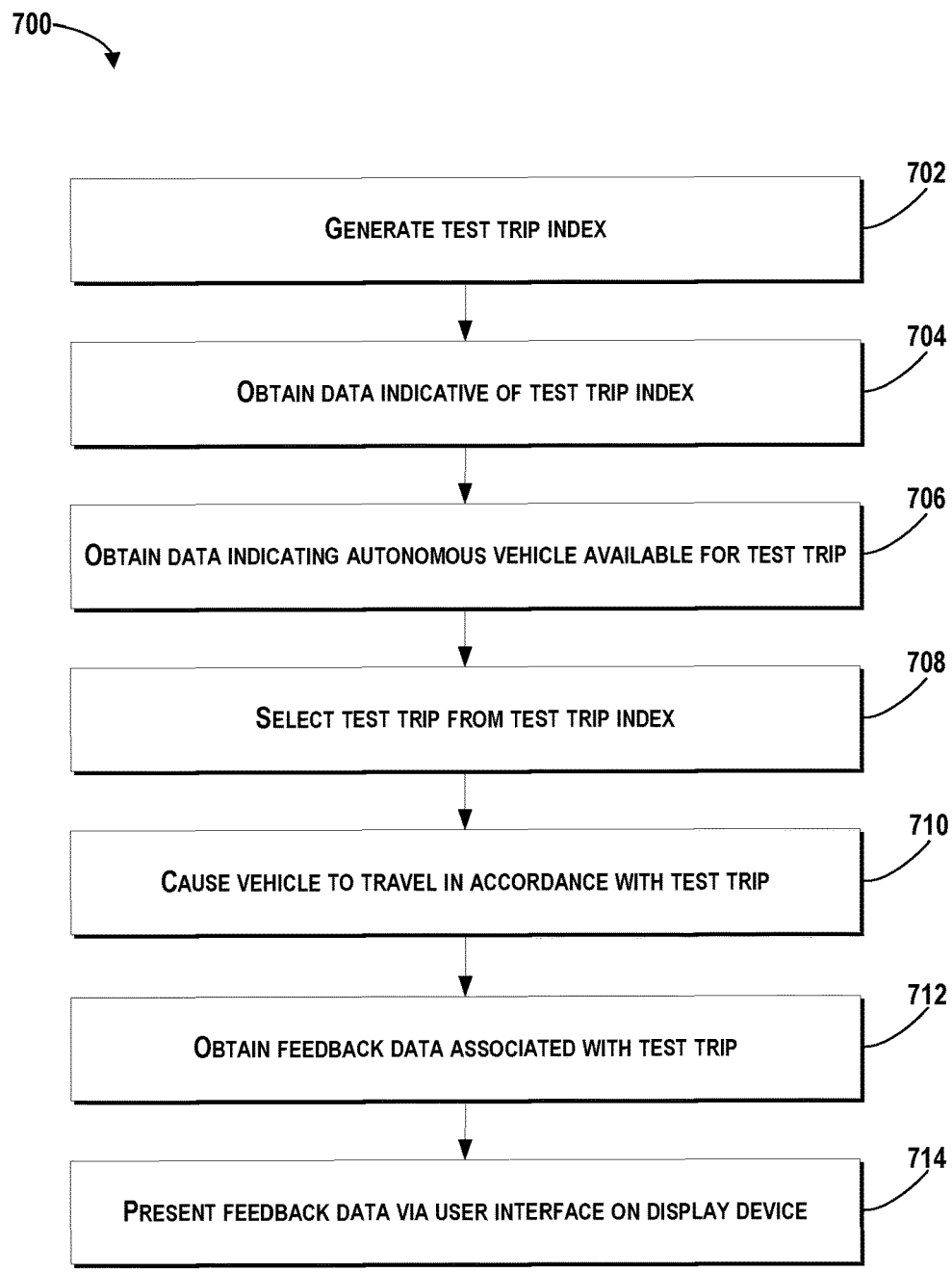
FIG. 7 depicts a flow diagram of an example method of controlling autonomous vehicle test trips according to example embodiments of the present disclosure.

FIG. 7 depicts a flow diagram of an example method 700 of controlling autonomous vehicle test trips according to example embodiments of the present disclosure. One or more portion(s) of the method 700 can be implemented by one or more computing devices such as, for example, the one or more computing device(s) of the operations computing system 106 and/or other systems (e.g., the vehicle computing system 102). Each respective portion of the method 700 (e.g., 702-714) can be performed by any (or any combination) of the one or more computing devices. Moreover, one or more portion(s) of the method 700 can be implemented as an algorithm on the hardware components of the device(s) described herein (e.g., as in FIGS. 1, 4, and 8), for example, to control autonomous vehicle test trip deployment and implementation as well as to cause an autonomous vehicle to travel in accordance with a test trip. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (702), the method 700 can include generating a test trip index. For instance, the operations computing system 106 (e.g., a front-end computing system 402) can provide, (e.g., for display via a user interface 202, 302 of a display device 200, 300), data indicative of the test trip index 204. The test trip index 204 can be associated with a vehicle 104 (and/or a plurality of vehicles). The test trip index 204 can include a plurality of test trips 206A-D for the vehicle 104. The plurality of test trips 206A-D are not generated in response to a service request for a vehicle service provided by the vehicle 104, but are rather intended for testing of the vehicle 104 (and/or to gather test data).

Each test trip 206A-D can be associated with one or more test trip parameters 208. For example, the test trip parameters can include at least one of an origin location, a destination location, or a vehicle route. As described herein, the plurality of test trips 206A-D and the test trip parameters 208 can be specified by a user 250 based at least in part on user input 240, 340 associated with a user interface 202, 302, by the user 250. In this way, the test trip parameters 208 can be manually specified (e.g., by a user 250 via user input 240). Additionally, or alternatively, one or more of the test trips 206A-D and/or test trip parameters 208 can be automatically generated by the operations computing system 106 (e.g., based at least in part on geographic region, time, day, historical data, etc.), as described herein. For example, the test trip parameters 208 can be created in real-time (by the operations computing system 106). As described herein, the origin location and the destination location can each include a randomly selected location within a geographic area (e.g., as selected by the operations computing system 106).

At (704), the method 700 can include obtaining data indicative of the test trip index. For example, the operations computing system 106 can obtain data indicative of the test trip index 204 (e.g., as specified by the user input 240, 340) associated with the vehicle 104. The operations computing system 106 can store the test trip index 204 in a memory (e.g., CRUD memory device) that is accessible by the operations computing system 106.

At (706), the method 700 can include obtaining data indicating that a vehicle is available for a test trip. For instance, the operations computing system 106 can obtain data indicating that the vehicle 104 is available to travel in accordance with at least one of the test trips 206A-D of the test trip index 204. By way of example, the vehicle 104 can enter into a particular operating mode (e.g., the test trip operating mode 108D) when the vehicle 104 is available for test trip deployment. The operations computing system 106 can obtain data indicating that the vehicle 104 is in a particular operating mode (e.g., the test trip operation mode 108D).

At (708), the method 700 can include selecting a test trip from the test trip index for the vehicle. The operations computing system 106 can obtain the data indicative of the test trip index 204 from the accessible memory in which the test trip index 204 is stored (e.g., directly from the memory, via an intermediary computing device, etc.). The operations computing system 106 can select, from the test trip index 204, at least one selected test trip for the vehicle 104. In some implementations, the selected test trip(s) can be selected based at least in part on an order of test trips 206A-D (e.g., as indicated in the test trip index 204, specified by the user 250, etc.). In some implementations, the selected test trip(s) can be selected based on other criteria (e.g., one or more constraints 210, status, etc.) and/or approaches (e.g., to maximize convenience, minimize miles travelled/environmental impact, randomly, etc.), as described herein.

At (710), the method 700 can include causing the vehicle to travel in accordance with the test trip. For instance, the operations computing system 106 can cause the vehicle 104 to travel in accordance with the test trip parameters 208 of the at least one selected test trip (e.g., 206A). By way of example, the operations computing system 106 can provide data indicative of the at least one selected test trip 206A to the vehicle computing system 102 onboard the vehicle 104. The vehicle computing system 102 can cause the vehicle 104 to travel in accordance with the test trip parameters 208 associated with the at least one selected test trip 206A. For example, the vehicle computing system 102 can generate a motion plan 134 for the vehicle 104 based at least in part on the test trip parameters 208 (e.g., to travel from the origin, to the destination, in accordance with a vehicle route, etc.).

At (712), the method 700 can include obtaining feedback data associated with the test trip. For instance, the operations computing system 106 can obtain feedback data 504, 604 associated with the at least one selected test trip (e.g., 206A). The feedback data 504, 604 can be indicative of one or more vehicle operating conditions during the at least one selected test trip 206A. For example, the feedback data 504, 604, can be indicative of at least one of a measurement of how much the vehicle 104 travelled without manual human user control during the at least one selected test trip 206A, a measurement of how much the vehicle travelled with manual human user control during the at least one selected test trip 206A, or a status of the at least one test trip 206A. As described herein, the operations computing system 106 can present, for display, the feedback data 604 associated with the at least one selected test trip 206A via a user interface 602 on a display device 600 (e.g., such that it is viewable by a user onboard and/or off-board the vehicle 104), at (714).

Figure 8:
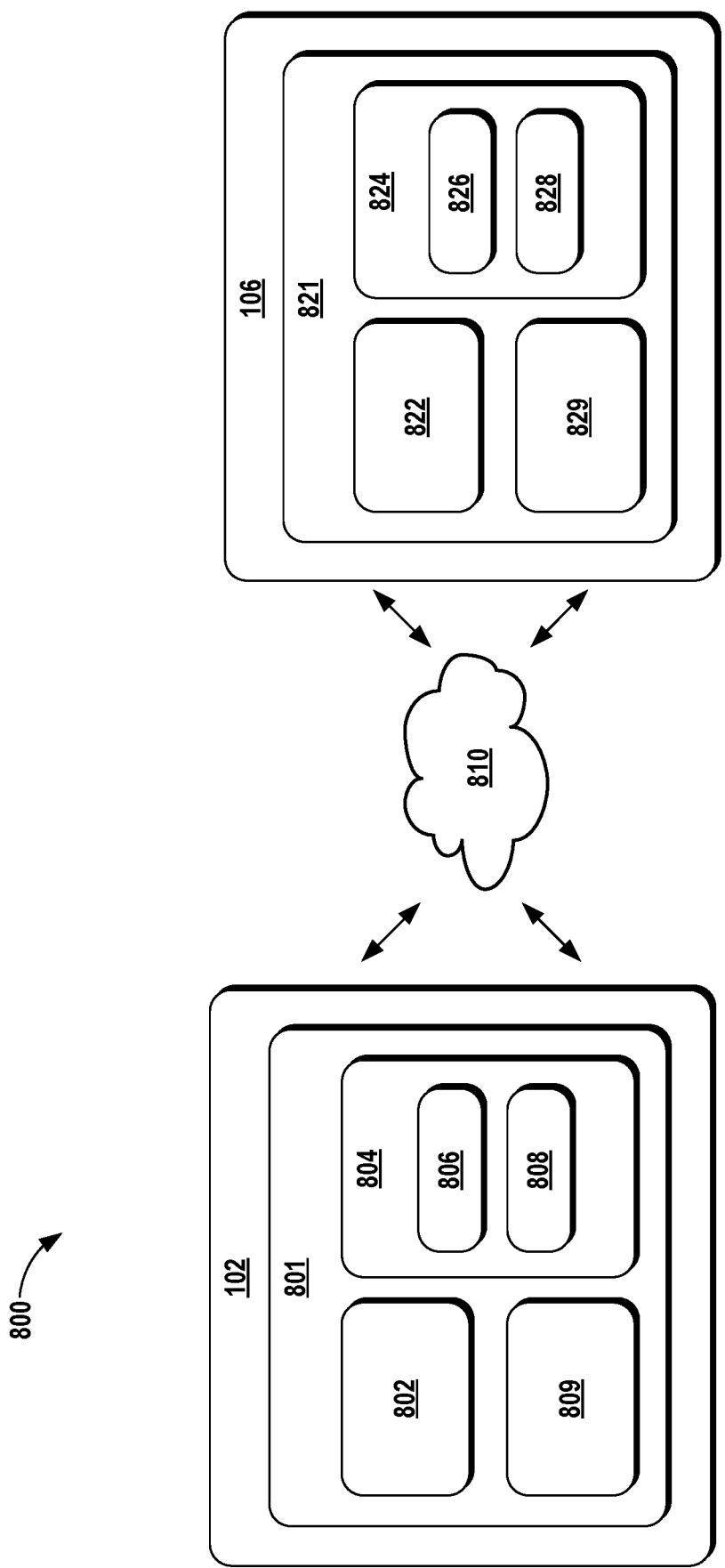
FIG. 8 depicts example system components according to example embodiments of the present disclosure.

FIG. 8 depicts an example system 800 according to example embodiments of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The example system 800 can include the vehicle computing system 102 of the vehicle 104 and the operations computing system 106 that can be communicatively coupled to one another over one or more networks 810. As described herein, the operations computing system 106 can be associated with a central operations system and/or an entity associated with the vehicle 104 such as, for example, a vehicle owner, vehicle manager, fleet operator, service provider, etc.

The computing device(s) 801 of the vehicle computing system 102 can include processor(s) 802 and a memory 804. The one or more processors 802 can be any suitable processing device (e.g., a processor core, a microprocessor, an ASIC, a FPGA, a controller, a microcontroller, etc.) and can be one processor or a plurality of processors that are operatively connected. The memory 804 can include one or more non-transitory computer-readable storage media, such as RAM, ROM, EEPROM, EPROM, one or more memory devices, flash memory devices, data registrar, etc., and combinations thereof.

The memory 804 can store information that can be accessed by the one or more processors 802. For instance, the memory 804 (e.g., one or more non-transitory computer-readable storage mediums, memory devices) on-board the vehicle 104 can include computer-readable instructions 806 that can be executed by the one or more processors 802. The instructions 806 can be software written in any suitable programming language or can be implemented in hardware. Additionally, or alternatively, the instructions 806 can be executed in logically and/or virtually separate threads on processor(s) 802.

For example, the memory 804 on-board the vehicle 104 can store instructions 806 that when executed by the one or more processors 802 on-board the vehicle 104 cause the one or more processors 802 (the vehicle computing system 102) to perform operations such as any of the operations and functions of the vehicle computing system 102, the operations for implementing a test trip, the operations for communicating with the operations computing system, the operations for adjusting vehicle operating mode, and/or any other operations and functions of the vehicle computing system 102, as described herein.

The memory 804 can store data 808 that can be obtained, received, accessed, written, manipulated, created, and/or stored. The data 808 can include, for instance, data associated with an operating mode of the vehicle, data associated with a test trip (e.g., test trip parameters, etc.), feedback data, and/or other data/information as described herein. In some implementations, the computing device(s) 801 can obtain data from one or more memories that are remote from the vehicle 104.

The computing device(s) 801 can also include a communication interface 809 used to communicate with one or more other system(s) on-board the vehicle 104 and/or a remote computing device that is remote from the vehicle 104 (e.g., of the operations computing system 106). The communication interface 809 can include any circuits, components, software, etc. for communicating via one or more networks (e.g., 810). In some implementations, the communication interface 809 can include, for example, one or more of a communications controller, receiver, transceiver, transmitter, port, conductors, software and/or hardware for communicating data.

The operations computing system 106 can include one or more computing devices 821 that are remote from the vehicle computing system 102. The computing device(s) 821 can include computing device(s) that implement one or more of the systems/components described with respect to FIG. 4. The computing device(s) 821 of the operations computing system 106 can include one or more processors 822 and a memory 824. The one or more processors 822 can be any suitable processing device (e.g., a processor core, a microprocessor, an ASIC, a FPGA, a controller, a microcontroller, etc.) and can be one processor or a plurality of processors that are operatively connected. The memory 824 can include one or more tangible, non-transitory computer-readable storage media, such as RAM, ROM, EEPROM, EPROM, one or more memory devices, flash memory devices, data registrar, etc., and combinations thereof.

The memory 824 can store information that can be accessed by the one or more processors 822. For instance, the memory 824 (e.g., one or more tangible, non-transitory computer-readable storage media, one or more memory devices, etc.) can include computer-readable instructions 826 that can be executed by the one or more processors 822. The instructions 826 can be software written in any suitable programming language or can be implemented in hardware. Additionally, or alternatively, the instructions 826 can be executed in logically and/or virtually separate threads on processor(s) 822.

For example, the memory 824 can store instructions 826 that when executed by the one or more processors 822 cause the one or more processors 822 (the operations computing system 106) to perform operations such as any of the operations and functions of the operations computing system 106 or for which the operations computing system 106 is configured, as described herein, the operations and functions of one or more of the components/systems of FIG. 4 or for which such systems/components are configured, operations and functions for controlling autonomous vehicle test trips (e.g., one or more portions of method 700), and/or any other operations and functions described herein.

The memory 824 can store data 828 that can be obtained, received, accessed, written, manipulated, created, and/or stored. The data 828 can include, for instance, data indicative of test trip index, data indicative of test trip parameters, data indicative of constraints, data indicative of the vehicle(s) assigned to a test trip index, data indicative of vehicle operating modes, data indicative of test trip status, data indicative of feedback data, data indicative of user interfaces, data indicative of user input, other data associated with a vehicle and/or a user, and/or other data/information as described herein. In some implementations, the computing device(s) 821 can obtain data from one or more memories that are remote from the operations computing system 106 and/or are onboard the vehicle 104.

The computing device(s) 821 can also include a communication interface 829 used to communicate with one or more system(s) onboard the vehicle 104 and/or another computing device that is remote from the operations computing system 106. The communication interface 829 can include any circuits, components, software, etc. for communicating via one or more networks (e.g., 810). In some implementations, the communication interface 829 can include, for example, one or more of a communications controller, receiver, transceiver, transmitter, port, conductors, software and/or hardware for communicating data.

The network(s) 810 can be any type of network or combination of networks that allows for communication between devices. In some embodiments, the network(s) 810 can include one or more of a local area network, wide area network, the Internet, secure network, cellular network, mesh network, peer-to-peer communication link and/or some combination thereof and can include any number of wired or wireless links. Communication over the network(s) 810 can be accomplished, for instance, via a communication interface using any type of protocol, protection scheme, encoding, format, packaging, etc.

Computing tasks discussed herein as being performed at computing device(s) remote from the vehicle can instead be performed at the vehicle (e.g., via the vehicle computing system), or vice versa. Moreover, computing tasks discussed herein as being performed by the operations computing system can be performed by another computing system. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for controlling autonomous vehicles, comprising:
    obtaining, by a computing system comprising one or more computing devices, data indicative of a trip data structure associated with an autonomous vehicle, wherein the trip data structure comprises a plurality of trips by which the autonomous vehicle is to travel without providing a vehicle service;
    determining, by the computing system, that the autonomous vehicle has completed a vehicle service for a user in response to a first service request and that the autonomous vehicle has not been assigned a second service request;
    determining, by the computing system, that the autonomous vehicle is available to travel in accordance with at least one of the trips of the trip data structure by which the autonomous vehicle is to travel without providing a vehicle service based at least in part on the determination that the autonomous vehicle has completed the vehicle service for the user in response to the first service request and that the autonomous vehicle has not been assigned the second service request;
    selecting, by the computing system and from the trip data structure, at least one selected trip for the autonomous vehicle while the autonomous vehicle is available to travel in accordance with at least one of the trips of the trip data structure; and
    providing, by the computing system to the autonomous vehicle or another computing system associated with the autonomous vehicle, data indicative of the at least one selected trip so that the selected trip can be accepted or rejected for the autonomous vehicle to perform the at least one selected trip while the autonomous vehicle is available to travel in accordance with the at least one selected trip.

2. The computer-implemented method of claim 1, further comprising:
    providing, by the computing system for display through a user interface of a display device, data indicative of the trip data structure, wherein the plurality of trips and a plurality of trip parameters are specified based at least in part on user input associated with the user interface.

3. The computer-implemented method of claim 2, wherein the trip parameters comprise at least one of: (i) an origin location, (ii) a destination location, or (iii) a vehicle route.

4. The computer-implemented method of claim 2, wherein the display device is remote from the autonomous vehicle.

5. The computer-implemented method of claim 2, wherein the user interface comprises a map user interface.

6. The computer-implemented method of claim 5, wherein the map user interface depicts a map of a geographic area in which the autonomous vehicle is located and is indicative of at least one of the following for the selected trip: (i) an origin location, (ii) a destination location, or (iii) a vehicle route.

7. The computer-implemented method of claim 1, further comprising:
    associating, by the computing system, the trip data structure with the autonomous vehicle.

8. The computer-implemented method of claim 7, wherein associating the trip data structure with the autonomous vehicle comprises:
    associating, by the computing system, the trip data structure with the autonomous vehicle based at least in part on user input associated with a user interface.

9. The computer-implemented method of claim 1, further comprising:
    obtaining, by the computing system, feedback data associated with the at least one selected trip; and
    presenting, by the computing system for display through a user interface of a display device, the feedback data associated with the at least one selected trip.

10. The computer-implemented method of claim 9, wherein the feedback data is indicative of one or more vehicle operating conditions during the at least one selected trip.

11. The computer-implemented method of claim 1, wherein the trip data structure is associated with one or more constraints, and wherein the one or more constraints comprise at least one of: (i) a time constraint, (ii) a weather constraint, or (iii) a vehicle constraint.

12. The computer-implemented method of claim 1, wherein the first service request is a request to transport goods.

13. The computer-implemented method of claim 12, wherein the autonomous vehicle is a truck.

14. A computing system comprising:
one or more processors; and
one or more memory devices, the one or more memory devices storing instructions that when executed by the one or more processors cause the computing system to perform operations, the operations comprising:
obtaining data indicative of a trip data structure, wherein the trip data structure comprises a plurality of trips by which an autonomous vehicle is to travel without providing a vehicle service;
determining that the autonomous vehicle has completed a vehicle service for a user in response to a first service request and that the autonomous vehicle has not been assigned a second service request;
determining that the autonomous vehicle is available to travel in accordance with at least one of the trips of the trip data structure by which the autonomous vehicle is to travel without providing a vehicle service based at least in part on the determination that the autonomous vehicle has completed the vehicle service for the user in response to the first service request and that the autonomous vehicle has not been assigned the second service request;
selecting, from the trip data structure, at least one selected trip for the autonomous vehicle while the autonomous vehicle is available to travel in accordance with at least one of the trips of the trip data structure; and
providing, to the autonomous vehicle or another computing system associated with the autonomous vehicle, data indicative of the at least one selected trip so that the selected trip can be accepted or rejected for the autonomous vehicle to perform the at least one selected trip while the autonomous vehicle is available to travel in accordance with the at least one selected trip.

15. The computing system of claim 14, wherein the operations further comprise:
obtaining data indicative of an acceptance or a rejection of the at least one selected trip.

16. The computing system of claim 14, wherein the operations further comprise:
providing, for display through a user interface of a display device, data indicative of the trip data structure comprising the plurality of trips and a plurality of trip parameters.

17. The computing system of claim 16, wherein the user interface comprises a map user interface, wherein the trip parameters comprise at least one of: (i) an origin location, (ii) a destination location, or (iii) a vehicle route.

18. The computing system of claim 17, wherein the trip parameters are specified based at least in part on user input associated with the map user interface.

19. One or more tangible, non-transitory computer-readable media storing computer-readable instructions that when executed by one or more processors cause the one or more processors to perform operations, the operations comprising:
obtaining data indicative of a trip data structure, wherein the trip data structure comprises a plurality of trips that do not include provision of a vehicle service;
determining that an autonomous vehicle has completed a vehicle service for a user in response to a first service request and that the autonomous vehicle has not been assigned a second service request;
determining that the autonomous vehicle is available to travel in accordance with at least one of the trips of the trip data structure by which the autonomous vehicle is to travel without providing a vehicle service based at least in part on the determination that the autonomous vehicle has completed the vehicle service for the user in response to the first service request and that the autonomous vehicle has not been assigned the second service request;
selecting, from the trip data structure, at least one selected trip for the autonomous vehicle while the autonomous vehicle is available to travel in accordance with at least one of the trips of the trip data structure; and
providing, to the autonomous vehicle or another computing system associated with the autonomous vehicle, data indicative of the at least one selected trip so that the selected trip can be accepted or rejected for the autonomous vehicle to perform the at least one selected trip while the autonomous vehicle is available to travel in accordance with the at least one selected trip.

20. The one or more tangible, non-transitory computer-readable media of claim 19, wherein each trip is associated with one or more trip parameters.

21. The one or more tangible non-transitory computer-readable media of claim 20, wherein the one or more trip parameters are definable by user input.

22. The one or more tangible non-transitory computer-readable media of claim 20, wherein the one or more trip parameters can be monitored by the user through a user interface.

\* \* \* \* \*